United States Patent
Lo et al.

(10) Patent No.: US 12,417,425 B2
(45) Date of Patent: *Sep. 16, 2025

(54) SYSTEM AND METHOD FOR CONDITIONAL DELIVERY OF A TRANSPORT CONTAINER

(71) Applicant: MOTOGO, LLC, Austin, TX (US)

(72) Inventors: Yuan-Chang Lo, Snoqualmie, WA (US); Roy William Stedman, Austin, TX (US); David Brian Ruth, Austin, TX (US)

(73) Assignee: Motogo, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,168

(22) Filed: Nov. 15, 2023

(65) Prior Publication Data

US 2024/0086823 A1    Mar. 14, 2024

Related U.S. Application Data

(63) Continuation of application No. 16/723,481, filed on Dec. 20, 2019, now Pat. No. 11,861,544.
(Continued)

(51) Int. Cl.
*G06Q 10/0832* (2023.01)
*G06Q 10/083* (2024.01)
(Continued)

(52) U.S. Cl.
CPC ..... *G06Q 10/0832* (2013.01); *G06Q 10/0833* (2013.01); *G06Q 10/0835* (2013.01);
(Continued)

(58) Field of Classification Search
CPC .......... G06Q 10/0832; G06Q 10/083
See application file for complete search history.

(56) References Cited

U.S. PATENT DOCUMENTS 3,718,218 A    2/1973   Shields
4,183,708 A    1/1980   Kuhbier et al.
(Continued)

FOREIGN PATENT DOCUMENTS

DE    102009021529 A1    11/2010
EP         2313321 A1     4/2011

OTHER PUBLICATIONS

Duffy, "Get Organized: How to Send Gifts and Greeting Cards on Time, Every Time," Published by www.pcmag.com, Apr. 4, 2016, Retrieved from https://www.pcmag.com/how-to/get-organized-how-to-send-gifts-and-greeting-cards-on-time-every-time (Year: 2016).*
(Continued)

*Primary Examiner* — Shannon S Campbell
*Assistant Examiner* — Bryan J Kirk
(74) *Attorney, Agent, or Firm* — Moore Intellectual Property Law, PLLC

(57) ABSTRACT

A system includes a transport container, a delivery management server, and a delivery vehicle. The transport container includes a secure space for holding an item. The delivery management server includes a delivery platform communication interface, a condition detection interface, a rules engine, and a transmission system. The delivery platform communication interface is configured to receive a delivery order for the transport container that includes instructions to defer a delivery operation until a specified condition is satisfied. The rules engine is configured to, responsive to determining that the specified condition is satisfied, generate a command to execute the delivery operation. The transmission system is for transmitting the command to a delivery vehicle. The delivery vehicle includes a vehicle communication interface and an electromechanical interface. The vehicle communication interface is configured to receive the command. The electromechanical interface configured to
(Continued)

couple or decouple the transport container with the delivery vehicle.

19 Claims, 15 Drawing Sheets

Related U.S. Application Data

(60) Provisional application No. 62/784,281, filed on Dec. 21, 2018.

(51) Int. Cl.
    *G06Q 10/0833*    (2023.01)
    *G06Q 10/0835*    (2023.01)
    *G06Q 10/0836*    (2023.01)
    *G06Q 20/02*      (2012.01)
    *G06Q 20/40*      (2012.01)

(52) U.S. Cl.
    CPC ..... *G06Q 10/0836* (2013.01); *G06Q 10/0838* (2013.01); *G06Q 20/02* (2013.01); *G06Q 20/405* (2013.01)

(56) References Cited

U.S. PATENT DOCUMENTS

| | | | |
|---|---|---|---|
| 6,474,472 B1 | 11/2002 | Shaw | |
| 6,929,181 B1* | 8/2005 | Oswalt | G06Q 10/08 235/375 |
| 7,191,932 B2 | 3/2007 | Fobbe et al. | |
| 7,399,148 B2 | 7/2008 | Bruun | |
| 8,224,664 B1* | 7/2012 | Louie | G16H 20/13 705/2 |
| 8,888,059 B2 | 11/2014 | Kohberg et al. | |
| 9,211,771 B1 | 12/2015 | Charbonnier | |
| 9,292,986 B1 | 3/2016 | Woodward, III et al. | |
| 9,536,216 B1* | 1/2017 | Lisso | B65B 43/00 |
| 9,718,611 B2 | 8/2017 | Gonzalez | |
| 9,842,449 B1 | 12/2017 | Ruth | |
| 10,275,966 B1 | 4/2019 | Ruth | |
| 10,310,500 B1 | 6/2019 | Brady et al. | |
| 10,514,690 B1 | 12/2019 | Siegel et al. | |
| 10,789,567 B1 | 9/2020 | Ur | |
| 10,809,745 B2 | 10/2020 | Ruth et al. | |
| 10,997,544 B1* | 5/2021 | Bar-Zeev | B64F 1/18 |
| 11,508,197 B2 | 11/2022 | Ruth | |
| 11,714,429 B2 | 8/2023 | Ruth et al. | |
| 11,861,544 B2 | 1/2024 | Lo et al. | |
| 11,887,422 B2 | 1/2024 | Ruth | |
| 12,130,643 B2 | 10/2024 | Ruth et al. | |
| 2003/0156010 A1 | 8/2003 | Roeland | |
| 2004/0133304 A1 | 7/2004 | Fobbe et al. | |
| 2005/0046567 A1 | 3/2005 | Mortenson et al. | |
| 2006/0101877 A1 | 5/2006 | Orum et al. | |
| 2008/0010173 A1* | 1/2008 | Rendich | G06Q 30/06 705/28 |
| 2008/0061924 A1 | 3/2008 | Labowicz et al. | |
| 2010/0312272 A1 | 12/2010 | Pavcnik et al. | |
| 2012/0103031 A1 | 5/2012 | Grant et al. | |
| 2012/0323645 A1 | 12/2012 | Spiegel et al. | |
| 2014/0172734 A1* | 6/2014 | Ginda | G06Q 10/083 705/330 |
| 2015/0005733 A1 | 1/2015 | Le et al. | |
| 2015/0120597 A1* | 4/2015 | Dertadian | F25D 3/08 705/332 |
| 2016/0047142 A1 | 2/2016 | Gengler et al. | |
| 2016/0171439 A1 | 6/2016 | Ladden et al. | |
| 2016/0185466 A1 | 6/2016 | Dreano | |
| 2016/0215533 A1 | 7/2016 | Choi et al. | |
| 2016/0232489 A1* | 8/2016 | Skaaksrud | G06Q 10/0836 |
| 2017/0032258 A1 | 2/2017 | Miresmailli et al. | |
| 2017/0129603 A1 | 5/2017 | Raptopoulos et al. | |
| 2017/0233155 A1 | 8/2017 | Daws et al. | |
| 2017/0313421 A1 | 11/2017 | Gil | |
| 2018/0058739 A1* | 3/2018 | Zou | F25B 49/00 |
| 2018/0144642 A1 | 5/2018 | High et al. | |
| 2018/0158018 A1 | 6/2018 | Luckay et al. | |
| 2018/0186454 A1 | 7/2018 | Luckay et al. | |
| 2018/0205682 A1 | 7/2018 | O'Brien et al. | |
| 2018/0300834 A1 | 10/2018 | High et al. | |
| 2019/0012637 A1* | 1/2019 | Gillen | G06Q 10/0833 |
| 2019/0012640 A1 | 1/2019 | Ferguson et al. | |
| 2019/0028904 A1 | 1/2019 | Carpenter et al. | |
| 2019/0043001 A1 | 2/2019 | Woulfe et al. | |
| 2019/0070995 A1 | 3/2019 | Cantrell et al. | |
| 2019/0122322 A1* | 4/2019 | Perez | H04W 4/02 |
| 2019/0130689 A1* | 5/2019 | Baumgarte | H04L 9/3242 |
| 2019/0196479 A1 | 6/2019 | Kaneko et al. | |
| 2019/0196511 A1 | 6/2019 | Millhouse et al. | |
| 2019/0199813 A1* | 6/2019 | Mohammed | G06Q 10/0639 |
| 2019/0220819 A1 | 7/2019 | Banvait et al. | |
| 2019/0250643 A1 | 8/2019 | Takizawa | |
| 2020/0128991 A1 | 4/2020 | Jessie | |
| 2020/0202290 A1 | 6/2020 | Lo et al. | |
| 2023/0067784 A1 | 3/2023 | Ruth | |

OTHER PUBLICATIONS

Duffy, Jill, "Get Organized: How to Send Gifts and Greeting Cards on Time, Every Time," www.pcmag.com, Apr. 4, 2016, Retrieved from https://www.pcmag.com/how-to/get-organized-how-to-send-gifts-and-greeting-cards-on-time-every-time (Year: 2016), 4 pgs.

U.S. Appl. No. 18/326,824, filed May 31, 2023, David Brian Ruth.

Wang et al., "How to Choose "Last Mile" Delivery Modes for E-Fulfillment", Hindawi Publishing Corporation, Mathematical Problems in Engineering, vol. 2014, Jun. 11, 2014, pp. 1-11 (Year: 2014).

\* cited by examiner

Remote Temp Controlled
Storage Example

Travelers Laundry Example

SYSTEM AND METHOD FOR CONDITIONAL DELIVERY OF A TRANSPORT CONTAINER

CROSS-REFERENCE TO RELATED APPLICATION

The present application claims priority from commonly owned U.S. Non-Provisional application Ser. No. 16/723,481, filed Dec. 20, 2019, entitled "SYSTEM AND METHOD FOR CONDITIONAL DELIVERY OF A TRANSPORT CONTAINER," which claims priority from U.S. Provisional Application No. 62/784,281, filed Dec. 21, 2018, entitled "SYSTEM AND METHOD FOR CONDITIONAL DELIVERY," the contents of each of which are expressly incorporated herein by reference in their entirety. The present application incorporates by reference herein in its entirety contents of each of U.S. patent application Ser. No. 15/498,012, filed Apr. 26, 2017, now U.S. Pat. No. 9,842,449, entitled "SECURE TRANSPORT CONTAINER," and U.S. Non-Provisional application Ser. No. 16/247,470, filed Jan. 14, 2019, now U.S. Pat. No. 10,809,745, entitled "SYSTEM AND METHOD OF LAST MILE DELIVERY."

BACKGROUND

Package delivery systems have not changed much over the years, especially for the senders and recipients. Typically, the customer can only specify where the package is to be picked up and where the package is to be delivered, and how quickly. For example, if a customer wants to send items (e.g., clothes) to a destination to which the customer is traveling and does not want to travel with the items, the customer has to ship the items to the destination. Existing shipping systems lack the flexibility to synchronize the delivery of the items with the arrival of the customer at the destination, or to return the items to the origin if the trip is canceled. If the traveling customer would like to have the items (e.g., clothes) picked up from the destination, laundered, and delivered to another destination, the customer has to rely on a laundry service to ship the items using a conventional shipping service.

Selling an expensive item person-to-person online can pose risk for both the seller and the buyer. If the seller ships the item before receiving payment, the seller risks the buyer keeping the item without paying or the buyer falsely claiming that an incorrect or damaged item was received. If the buyer pays before receiving the item, the buyer risks the seller keeping the payment without sending the item or falsely claiming that the correct item was shipped and in good condition. The seller and the buyer can use a third-party escrow service provider. For example, the seller can drop off the item at an escrow service provider and the buyer can make the payment to the escrow service provider. The escrow service provider can arrange for shipment after verifying the item and the payment. Negotiating a third-party escrow service provider trusted by both the seller and the buyer can be complicated. The pre-shipment delays and inconveniences make using third party escrow service providers impractical for individual buyers and sellers.

SUMMARY

Certain embodiments according to the present disclosure provide systems and methods for providing conditional delivery of transport containers. One or more steps in a delivery process, such as opening a container, performing a requested service on contents of the container, transporting the container toward a delivery destination, or releasing the container from an anchor point, are deferred until a specified condition is satisfied.

Some embodiments according to the present disclosure include a system for conditional delivery of a transport container in a secure delivery system. The system includes a transport container, a delivery management server, and a delivery vehicle. The transport container includes a secure space for holding an item for secure delivery. The transport container also includes a docking attachment point configured to securely attach to a docking anchor point. The transport container further includes a container communication interface configured to transmit and receive a plurality of logistics parameters.

The delivery management server includes a delivery platform communication interface, a condition detection interface, a rules engine, and a transmission system. The delivery platform communication interface is configured to receive a delivery order for the transport container. The transmission system is for transmitting the command to a delivery vehicle. The delivery order includes instructions to defer a delivery operation until a specified condition is satisfied. The delivery order further includes handling parameters for controlling one or more properties of the secure space. The condition detection interface is for receiving a notification related to the specified condition. The rules engine is configured to determine whether the specified condition is satisfied. The rules engine is also configured to, responsive to determining that the specified condition is satisfied, generate a command to execute the delivery operation. In a particular aspect, the rules engine is configured to, responsive to determining that the specified condition is satisfied, generate a command to initiate performance of a service request and to execute the delivery operation. The transmission system is for transmitting the command to the delivery vehicle. The delivery vehicle includes a vehicle communication interface configured to receive the command. The vehicle also includes an electromechanical interface configured to couple or decouple the transport container to the delivery vehicle.

According to various embodiments, handling parameters for controlling environmental conditions within the transport container until a determination that the specified condition has been satisfied include parameters controlling storage of the transport container at a package reception point.

In some embodiments, the rules engine includes program code, which when executed by a processor, causes the rules engine to, response to determining whether the specified condition is satisfied, determine service actions for handling of the transport container until satisfaction of the specified condition. The service actions include storing the transport container at a reception point that satisfies storage parameters. The storage parameters are based at least in part on a determination of a minimum expected delivery time for the transport container to a next delivery point.

In certain embodiments, the condition detection interface includes a media scraping interface for receiving external notifications from published sources. The condition detection interface also includes a condition extraction parser for converting the external notifications from the published sources into condition parameters.

In some embodiments, the system further includes remote condition sensors, deployed in areas geographically separated from the delivery management server. The condition detection interface includes a sensor translation interface for receiving external notifications from the remote condition sensors. The condition detection interface also includes a condition extraction parser for converting the external notifications into condition parameters.

In some embodiments, a method for providing conditional delivery using a secure delivery system includes receiving, at a delivery management server, a notification that a transport container is received at a reception point from a delivery vehicle. The delivery vehicle is associated with the delivery management server. The method further includes receiving a delivery order at the delivery management server. The delivery order includes instructions to defer a delivery operation until a specified condition is satisfied. The method also includes deferring, by the delivery management server, performance of the delivery operation until the specified condition is satisfied. The method further includes, responsive to the specified condition being satisfied, transmitting from the delivery management server to a delivery transport vehicle an instruction to perform the delivery operation with the transport container.

In some embodiments, deferring the performance of the delivery operation includes transmitting, from the delivery management server to the delivery transport vehicle, instructions to route the transport container to a delivery target on a route determined to provide continuous transportation on the delivery transport vehicle. In a particular aspect, the route is calculated to have a travel time less than a threshold value. In some embodiments, deferring the performance of the delivery operation includes holding the secure package container in anchored storage at a reception point until the specified condition is satisfied.

According to various embodiments of this disclosure, deferring the performance of the delivery operation includes transmitting, from the delivery management server to the delivery transport vehicle, instructions to route the transport container to a delivery target on a route determined to provide continuous transportation on the delivery transport vehicle until the specified condition is satisfied.

In some embodiments, the method includes, responsive to a second specified condition being satisfied, transmitting from the delivery management server to the delivery transport vehicle instructions to route the transport container for return to the reception point.

In some embodiments, detecting satisfaction of a specified condition includes detecting from a distributed ledger (e.g., a blockchain) that a condition of a smart contract has been fulfilled. Further, according to certain embodiments, the method includes transmitting, from the delivery management server to the delivery transport vehicle, an instruction to record in the blockchain the receipt of the instruction to perform delivery of the transport container. In some embodiments, the method also include transmitting, from the delivery management server to the delivery transport vehicle, instructions to record in the blockchain, upon delivery of the transport container, fulfillment of the instruction to perform delivery of the transport container. In a particular aspect, the instructions to record in the blockchain are transmitted from the delivery management server to the transport container concurrently with transmission of the instruction to perform delivery of the transport container.

In some embodiments, the method includes, responsive to determining that the specified condition is satisfied, generating a command to initiate performance of a service request and to execute the delivery operation. The method also includes transmitting the command from the delivery management server to the delivery vehicle.

In some embodiments, the method includes, responsive to determining that a service request is completed, determining that the specified condition is satisfied. The method also includes, responsive to determining that the specified condition is satisfied, generating a command to execute the delivery operation. The method further includes transmitting the command from the delivery management server to the delivery vehicle.

According to at least one embodiment of this disclosure, a method for delivery via a secure delivery system includes receiving, at a delivery management server, a delivery order indicating a specified condition. The delivery order includes instructions to defer performance of a delivery operation with a transport container until the specified condition is satisfied. The method also includes, responsive to determining that the specified condition is satisfied within the transport container, transmitting, from the delivery management server to a delivery transport vehicle, instructions to perform the delivery operation with the transport container.

In some embodiments, the method also includes, responsive to the specified condition being satisfied, determining a delivery target for the transport container based on a delivery target rule indicated by the delivery order. The instruction to perform the delivery operation indicate the delivery target.

In some embodiments, the method further includes determining that a sensor of the transport container detects a physical condition of contents of the transport container. Responsive to determining that the physical condition satisfies a predetermined criterion, the instructions to perform the delivery operation are transmitted from the delivery management server to the delivery transport vehicle.

In some embodiments, the method also includes receiving a performance request at the delivery management server. The method further includes, responsive to receiving the performance request, determining by a rules engine of the delivery management server whether one or more delivery conditions are satisfied. Responsive to determining that the one or more delivery conditions are satisfied, the instructions to perform the delivery operation are transmitted from the delivery management server to the delivery transport vehicle.

In some embodiments, the method further includes determining, at a time, that the time is within a predetermined temporal window. Responsive to determining that the time is within the predetermined temporal window, the instructions to perform the delivery operation are transmitted from the delivery management server to the delivery transport vehicle.

In some embodiments, the transportation system includes a transport container, a transport vehicle, and a transport resource allocation server. The transport container includes a reporting system for reporting a status and a location of the transport container. The transport vehicle is configured to move a plurality of transport containers. The transport vehicle includes an attachment point, a local data reporting system, and a remote wireless communication system. The attachment point is configured to secure the transport container to a given location. In this regard, the attachment point is configured to physically enforce the security and positioning of the transport container. The local data reporting system is configured to receive data from the reporting system of the transport container. The remote wireless communication system is configured to report data and receives instruction for routing the plurality of transport container between, inter alia, delivery targets (for example, humans who have placed an order for an item in a transport container) and attachment points.

The transport resource allocation server is configured to receive a transport order. According to various embodiments, the transport order includes a location, a plurality of attributes of an item to be transported in a transport container, and a time attribute. In various embodiments, the transport order includes instructions for deferred delivery. The transport resource allocation server is also configured to determine a security profile of the transport order. The transport resource allocation server is further configured to receive container data from the plurality of transport containers. The container data indicates locations, security features, and sizes of the transport containers. The transport resource allocation server is also configured to receive vehicle data from a plurality of transport vehicles. According to various embodiments, the vehicle data indicates locations and capabilities of the transport vehicles. The transport resource allocation server is further configured to select a transport container from a plurality of transport containers based in part on the security profile of the transport order and the security features of the transport container. The transport resource allocation server is also configured to select a transport vehicle from a plurality of transport vehicles. The transport resource allocation server is further configured to transmit a movement order to the selected transport vehicle to pick up the selected transport container.

Certain embodiments according to this disclosure provide a method for allocating a plurality of transport vehicles for moving a plurality of transport containers according to instructions for conditional delivery. The method includes receiving a transport order including an instruction for conditional delivery via a server transceiver included in a transport resource allocation server.

According to certain embodiments, a transport order includes a location, a plurality of attributes of an object to be transported in a transport container, and a time attribute of the transportation. The time attribute of the transportation includes an instruction for conditional delivery or an instruction to delay delivery until a specified condition is satisfied. The method also includes determining a security profile of the transport order with a processor included in the transport resource allocation server. The method further includes receiving, via the server transceiver, container data from a plurality of transport containers. The container data indicates locations, security features, and sizes of the transport containers. The method also includes receiving, via a transceiver, vehicle data from a plurality of transport vehicles. The vehicle data indicates a location and capabilities of the transport vehicles. The method further includes selecting a transport container from a plurality of transport containers, based in part on the security profile of the transport order and the security features of the plurality of transport containers included in the container data. The method also includes selecting, a transport vehicle from the plurality of transport vehicles. The method further includes transmitting, via the server transceiver, a movement order to the selected transport vehicle to pick up the selected transport container.

According to various embodiments of this disclosure, a transportation system is provided. The transportation system includes a plurality of transport containers, a plurality of transport vehicles, and a transport resource allocation server. Each of the transport containers includes a reporting system for reporting a status and a location of the transport container. The plurality of transport vehicles moves the plurality of transport containers according to instructions to defer delivery until a specified condition is satisfied. Each of the plurality of transport vehicles includes a plurality of attachment points, a local data reporting system, and a remote wireless communication system. Further attachment points are provided, in some embodiments, at stationary locations. The plurality of attachment points store transport containers. The local data reporting system receives data from respective reporting systems of transport containers. The remote wireless communication system reports the data and receives instructions detailing routing of the plurality of transport vehicles and allocation of the plurality of attachment points.

The transport resource allocation server is configured to receive container data from the plurality of transport containers. The container data indicates locations, security features, and sizes of each of the plurality of transport containers. The transport resource allocation server is also configured to receive vehicle data from the plurality of transport vehicles. The vehicle data indicates locations and capabilities of each of the plurality of transport vehicles. The transport resource allocation server is further configured to determine a container need of a first location. The container need includes a security profile. The transport resource allocation server is also configured to select a transport container from the plurality of transport containers based in part on the security profile of the container need and the security features of the plurality on transport containers included in the container data. The transport resource allocation server is further configured to select a transport vehicle from the plurality of transport vehicles. The transport resource allocation server is also configured to transmit a movement order to the selected transport vehicle to pick up the selected transport container.

Other aspects of the disclosure will become apparent by consideration of the detailed description and accompanying drawings.

DETAILED DESCRIPTION

For ease of description, each of the exemplary systems presented herein is described with reference to an illustrative example. Some examples may not describe or illustrate all components of the systems. Other exemplary embodiments may include more or fewer of each of the illustrated components, may combine some components, or may include additional or alternative components.

Figure 1:
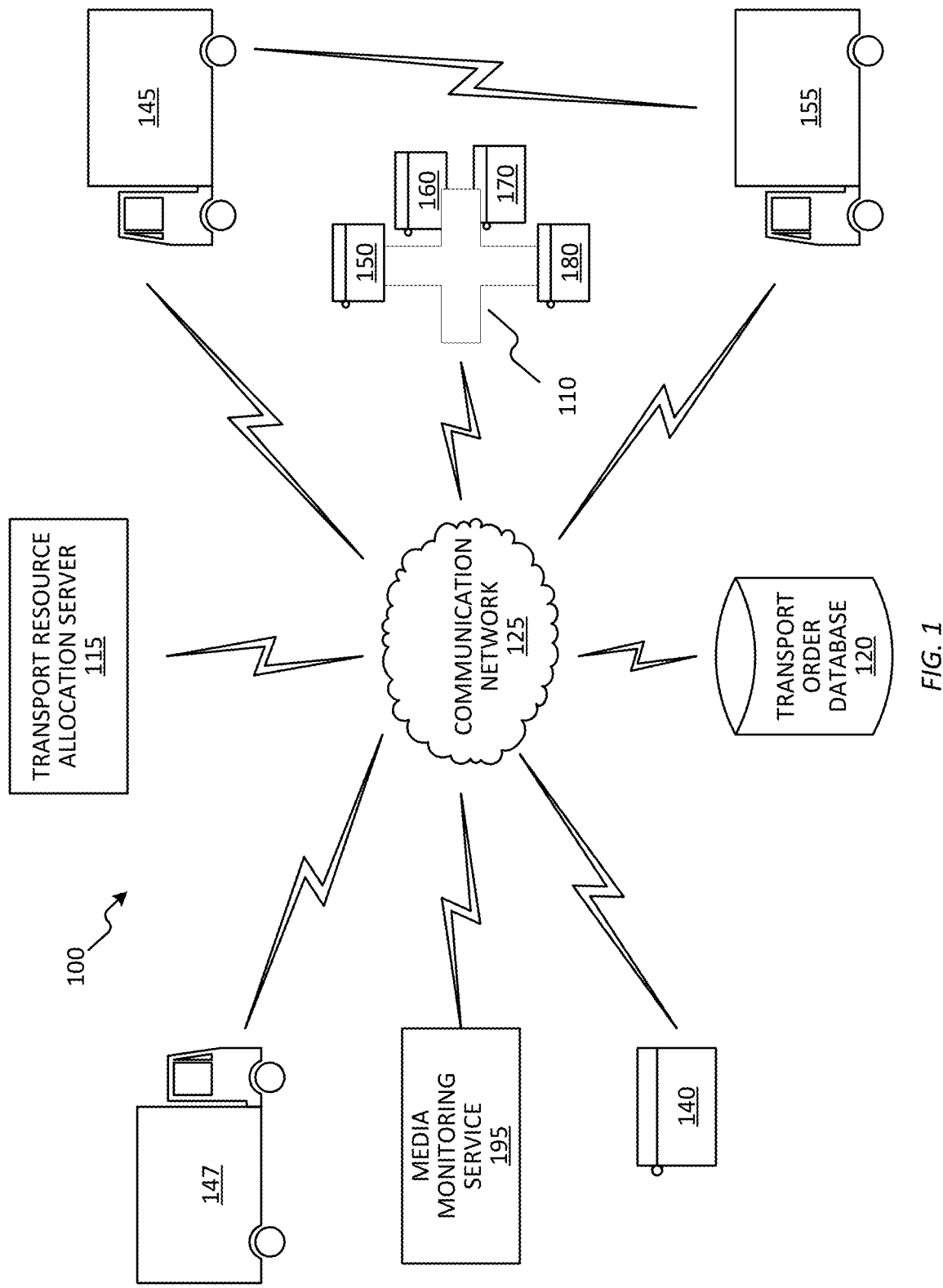
FIG. 1 illustrates aspects of a transportation system for implementing conditional delivery according to various embodiments of this disclosure.

FIG. 1 illustrates aspects of a transportation system 100 for implementing conditional delivery according to various embodiments of this disclosure. In the non-limiting example of FIG. 1, the transportation system 100 includes a plurality of transport containers 140, 150, 160, 170, and 180, a plurality of transport vehicles 145, 147, and 155, a transport resource allocation server 115, a transport order database 120, a docking attachment point 110, a media monitoring service 195, and a communication network 125.

Referring to the non-limiting example of FIG. 1, one or more of the transport containers 140, 150, 160, 170, of 180 are subject to instructions to defer performance of a delivery operation until a specified condition is satisfied. As used herein, the term "condition" encompasses both singular conditions as well as logical combinations (for example, "if this, then that . . . ") of conditions. In a particular aspect, a condition is based on a result of inference by a machine learning algorithm. A condition can be based on a value exceeding a threshold (e.g., a temperature value or a time value), a payment verification, a shipper location, a recipient location, or a combination thereof.

As used herein, the term "delivery operation" encompasses, without limitation, movement of a transport container, actuation of a component, such an anchor connection (e.g., the docking attachment point 110), an action performed on items within the transport container, etc. Examples of actions performed on contents within a transport container include, without limitation, applying heat to food in the transport container, mixing contents within the transport container, or applying a chemical to an item in a transport container (for example, a cleaning or deodorization agent). According to various embodiments, the term "delivery operation" encompasses actuating a component (for example, a locking mechanism on a door to a secure space of the transport container) to permit access for a service to be performed on an item located in the secure space of the transport container (for example, an item to be cleaned or repaired). In a particular aspect, the service can be performed on the item while the item is located in the secure space of the transport container. In a particular aspect, the item can be removed from the secure space of the transport container during or for performance of the service. As an example, performing the service includes removing the item from the secure space, washing the item outside the secure space, placing the washed item in the secure space, and drying the item while the item is located in the secure space.

As used herein, the terms "delivery order" and "transport order" are used interchangeably. As used herein, the terms "transport resource allocation server" and "delivery management server" are used interchangeably. As used herein, the terms "transport vehicle" and "delivery vehicle" are used interchangeably.

As used herein, in some embodiments, an instruction to defer performance of a delivery operation until a specified condition is satisfied comprises an instruction to a component within transportation system 100 (for example, the first transport vehicle 145 or the first transport container 140) to perform an operation provided as part of an overall process of taking possession of an item to be held within one of transport containers 140, 150, 160, 170, and 180 and to retain the items within one of transport containers 140, 150, 160, 170, and 180 in the transportation system 100, and to defer delivery until the specified condition is satisfied. The specified condition can include, for example, the passage of a specified period of time, a state of the item (e.g., cooked, frozen, melted, or dissolved), completion of a service request (e.g., cooked, laundered, ironed, etc.), receipt of a triggering piece of data (e.g., an order for the item), or an environmental condition. According to certain embodiments a shipper (not shown) releases one of the transport containers 140, 150, 160, 170, and 180 into the transportation system 100 with an instruction that delivery is conditional on satisfaction of one or more specified conditions. In various embodiments according to the present disclosure, a transportation system 100 provides to the shipper (not shown) the advantage of clearing the shipped item out of retained inventory immediately while allowing the recipient (also not shown) to enjoy the advantage of delivery timed to a specified condition, rather than to inherent transportation intervals of the transportation links, such as the transport vehicles 145, 147, or 155

Five transport containers 140, 150, 160, 170, and 180 are provided as an illustrative example. In some aspects, the system 100 includes fewer than five or more than five transport containers. The plurality of transport containers 140, 150, 160, 170, and 180 are illustrated in FIG. 1 as boxes including a body and a cover. In some embodiments, the plurality of transport containers 140, 150, 160, 170, and 180 can include transport containers similar to those described in U.S. patent application Ser. No. 15/498,012, now U.S. Pat. No. 9,842,449, entitled "SECURE TRANSPORT CONTAINER," filed Apr. 26, 2017, the entire contents of which are incorporated herein by reference in their entirety.

Three transport vehicles 145, 147, and 155 are provided as an illustrative example. In some aspects, the system 100 includes more than three or fewer than three transport vehicles. Referring to the non-limiting example of FIG. 1, the plurality of transport vehicles 145, 147, and 155 are trucks, which can be autonomous or human-operated. In some embodiments, one or more of the plurality of transport vehicles 145, 147, or 155 include, without limitation, manned flying vehicles, unmanned flying vehicles (e.g., drones), robots, boats, or any other type of vehicle capable of transporting one or more of the plurality of transport containers 140, 150, 160, 170, or 180 from one location to another location. One or more of the plurality of transport vehicles 145, 147, or 155 includes manned vehicles, autonomous vehicles (for example, autonomous transport robots), or semi-autonomous vehicles (for example, autonomous vehicles as described in U.S. Non-Provisional application Ser. No. 16/247,470 "SYSTEM AND METHOD OF LAST MILE DELIVERY" filed Jan. 14, 2019).

In certain embodiments, the communication network 125 includes a wired network, a wireless network, or both. The communication network 125 may be implemented using various networking protocols, including, without limitation, Internet-based communication protocols, short-range communications protocols, wireless communication protocols, a public switched telephone network, or a combination thereof. In a particular aspect, the Internet-based communication protocols include a technical report 069 (TR-069) protocol, hypertext transfer protocol (HTTP), or both. In a particular aspect, the short-range communications protocols include BLUETOOTH® (a registered trademark of BLUETOOTH SIG, Inc., Kirkland, Washington), near field communication (NFC), or both. In a particular aspect, the wireless communication protocols include longterm evolution (LTE®, a registered trademark of Institut European des Normes, Valbonne, France), Wi-Fi® (a registered trademark of Wi-Fi Alliance, Austin, Texas), or both. In a particular aspect, one or more of the plurality of transport containers, the plurality of transport vehicles, the transport resource allocation server 115, or other components illustrated in FIG. 1 communicate with each other using one or more of the above-described networking protocols. In some embodiments, communications with other external devices (not shown) occur over the communication network 125. Additionally, according to certain embodiments, elements within the transportation system 100 may communicate via peer-to-peer or sidelink communications, as illustrated in FIG. 1 by the link between the first transport vehicle 145 and the third transport vehicle 155.

The transportation system 100 illustrated in FIG. 1 is provided as one example of such a system. The methods described herein may be used with transportation systems with fewer, additional, or different components in different configurations than the transportation system 100 illustrated in FIG. 1. For example, in some embodiments, the transportation system 100 includes fewer or additional servers and may include fewer or additional databases. In a particular example, the first transport container 140 is configured to perform one or more operations described herein with respect to the transport resource allocation server 115. In a particular aspect, the transport resource allocation server 115 includes a distributed system and one or more components of the distributed system are configured to perform one or more operations described herein with respect to the transport resource allocation server 115. In a particular aspect, the transport resource allocation server 115 includes one or more components that reside within an edge computing system associated with a transport vehicle, a transport container, or both. Having the one or more components reside within the edge computing system enables particular operations of the transport resource allocation server 115 to be performed at the edge computing system, e.g., when Internet connection is unavailable.

Figure 2A:
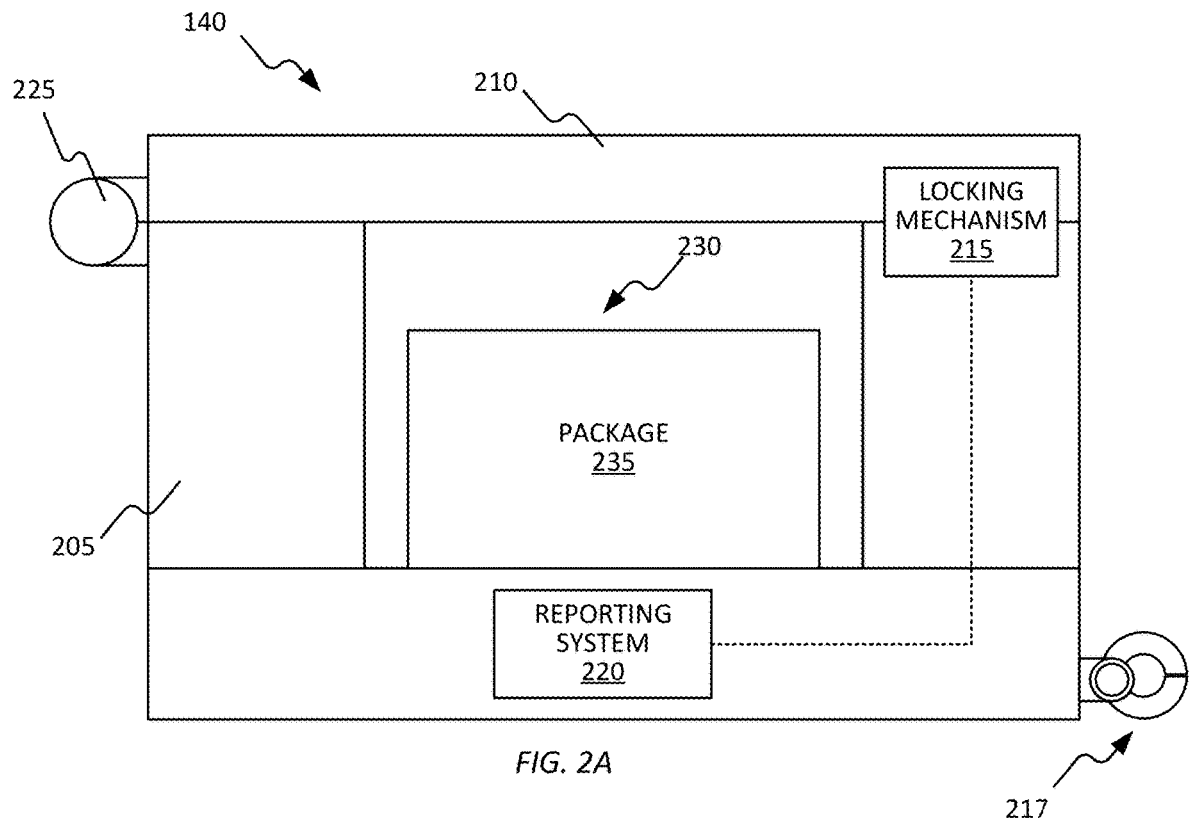
FIG. 2A illustrates a transport container for use in transportation system of FIG. 1, according to certain embodiments of this disclosure.

FIG. 2A illustrates an example of the first transport container 140. The first transport container 140 illustrated in FIG. 2A includes a body 205, a cover 210, a locking mechanism 215, a locking bar 217, and a reporting system 220. In the embodiment illustrated in FIG. 2A, the cover 210 is pivotably coupled to the body 205 via one or more hinges 225. In other embodiments, the cover 210 is coupled to the body 205 via other types of connectors (for example, sliding connectors). The body 205 is, in certain embodiments, generally box-shaped and defines a cavity 230. The cavity 230 holds the object or objects being transported and functions as a secure space within the first transport container 140. As an illustrative example, a package 235 is placed within the cavity 230 in FIG. 2A. In a particular example, the package 235 includes, without limitation, prepared food, groceries, medicine, electronic media (e.g., computer tapes, hard files, etc.), money, securities, or a combination thereof. In various embodiments, the body 205 may have a generally cylindrical shape (not shown) defined by an opening, a base, a cover and at least one side wall defining a cavity. Other configurations of the body 205 are possible and within the contemplated scope of this disclosure.

In some embodiments, the second transport container 150, the third transport container 160, and any other transport containers included in a transportation system for implementing conditional delivery (for example, the transportation system 100 of FIG. 1) can include all or some of the various components described herein with respect to the first transport container 140.

Figure 2B:
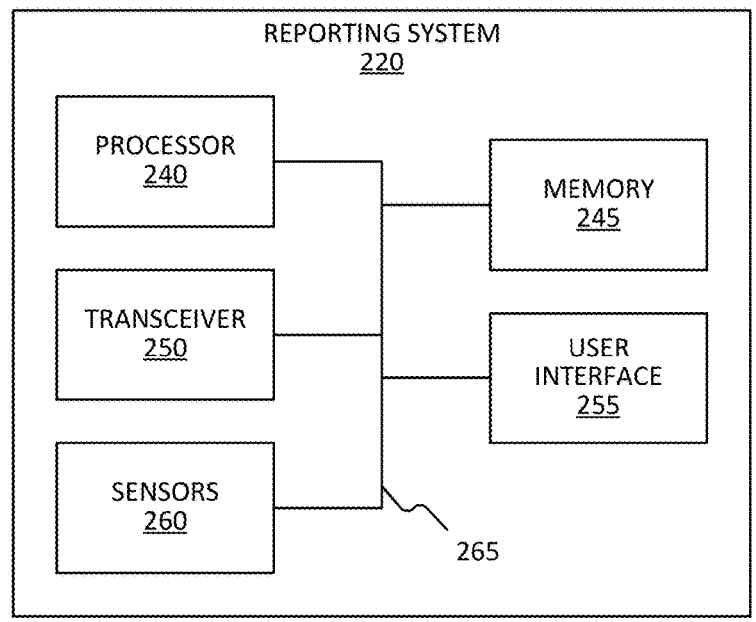
FIG. 2B illustrates a system included in the transport container of FIG. 2A according to some embodiments of the present disclosure.

FIG. 2B illustrates an example of a reporting system 220 incorporated as part of a transport container (for example, the first transport container 140), according to certain embodiments of this disclosure. In the non-limiting example of FIG. 2B, the reporting system 220 includes an electronic processor 240 (for example, a microprocessor or electronic controller), memory 245, a transceiver 250, a user interface 255, and a plurality of sensors and actuators 260. The electronic processor 240, the memory 245, as well as the other various modules are coupled by a bus 265, or are coupled directly, by one or more additional control or data buses, or a combination thereof. In some embodiments, the reporting system 220 may include fewer or additional components in configurations different from the configuration illustrated in FIG. 2B. The reporting system 220 includes the transceiver 250 as an example of a container communication interface. In other implementations, the container communication interface includes the transceiver 250, another type of communication interface, or both.

The memory 245 includes read only memory (ROM), random access memory (RAM), an electrically erasable programmable read-only memory (EEPROM), other non-transitory computer-readable media, or any combination thereof. The electronic processor 240 is configured to retrieve program instructions and data from the memory 245 and execute, among other things, instructions to perform the methods described herein. Additionally or alternatively, the memory 245 is included in the electronic processor 240.

The transceiver 250 is configured to provide communications between components of the first transport container 140 and components of the transport vehicles or other components within the transportation system 100. The transceiver 250 transmits signals to one or more communication networks and receives signals from the communication network 125. According to certain embodiments, the signals include, for example, data, data packets, or any combination thereof. In some embodiments, the transceiver 250 includes separate transmitters and receivers.

The user interface 255 can include any combination of digital and analog input devices to achieve a desired level of control for the first transport container 140. For example, the user interface 255 can include a display, a camera, a video camera, a speaker, a fingerprint sensor, a plurality of knobs, dials, switches, buttons, and the like. In some embodiments, the user interface 255 includes a touch-sensitive interface (for example, touch-screen display) that displays visual output generated by software applications executed by the electronic processor 240. Visual output includes, for example, graphical indicators, lights, colors, text, images, graphical user interfaces (GUIs), combinations of the foregoing, and the like. The touch-sensitive interface includes a suitable display mechanism for displaying the visual output (for example, a light-emitting diode (LED) screen, a liquid crystal display (LCD) screen, and the like). The touch-sensitive interface also receives user input using detected physical contact (for example, detected capacitance or resistance). Based on the user input, the touch-sensitive interface outputs signals to the electronic processor 240 which indicate positions on the touch-sensitive interface currently being selected by physical contact.

According to various embodiments, the user interface 255 is fully physically integrated into the first transport container 140, such as through a built-in touch screen or keypad. According to some embodiments, the user interface 255 is embodied in whole or in part on physically separate hardware than the first transport container 140, including, without limitation as an application on a smart phone, or through a remote or console communicatively connected (for example, through a network cable, or over a Bluetooth Low Entergy radio link) to the first transport container 140.

In some embodiments, the sensors and actuators 260 include various sensors configured to detect various conditions within, around, or otherwise associated with the first transport container 140. The sensors and actuators 260 can include, without limitation, location sensors (e.g., global positioning system (GPS) sensors), environmental sensors (e.g., temperature sensors, water sensors, or humidity sensors), movement sensors (e.g., acceleration sensors that can detect dropping), atmospheric sensors (for example, barometers or hygrometers), audio sensors, electrical sensors, or any combination thereof.

In a particular aspect, a location of the first transport container 140 is communicated to the first transport container 140, via a physical connector or wireless communication, by an anchor point to which the first transport container 140 is attached. When the first transport container 140 is placed at a non-powered anchored location, the location of the first transport container 140 may be based upon the last location information that was provided by a transport vehicle. In a particular aspect, the first transport container 140 may determine the location by communicating with a unique anchor location transponder device which is fixed and broadcasts position data or a unique identification signature which is mapped to a physical location of the anchor location transponder device. In a particular aspect, the first transport container 140 (e.g., an acceleration sensor), in response to sensing movement after the first transport container 140 has been anchored to a non-powered location, generates a package security issue indication that a theft condition is underway.

In a particular aspect, package location sensing may include the ability for self-locating via techniques such as GPS. Self-locating is useful when the first transport container 140 is orphaned, i.e., when the first transport container 140 is not associated with a location services provider such as a transport vehicle or a powered anchored location (e.g., an anchor point). Self-locating also provides a way to validate that the location services provider position data (e.g., position data generated by the transport vehicle or the powered anchored location) aligns with the self-location position data generated by the first transport container 140. Validation of the position data can be useful to detect errors or security issues. Self-locating may be useful for transport containers (e.g., the first transport container 140) which are used to transport high valued items such as cash and securities, medical prescriptions, data storage devices, etc.

Additionally, in certain embodiments, the sensors and actuators 260 are coupled to devices, such as motors with motor encoders, which, in addition to providing sensor data or feedback, can also operate in response to control signals. For example, the sensors and actuators 260 may comprise an encoder motor coupled to a latch or locking mechanism of the first transport container 140, which can report on the current status of the latch, (for example, determining whether the latch is locked or not) and can also change the status of the latch.

In some aspects, the sensors and actuators 260 include one or more location sensors. The location sensors (for example, global positioning system (GPS) sensors) determine an absolute or relative location of the first transport container 140. In some embodiments, the location sensors determine the location of the first transport container 140 periodically. According to various embodiments, the location sensors determine the location of the first transport container 140 in response to receiving a request (for example, via the transceiver 250). For example, the recipient or sender of the first transport container 140 sends a request signal to the reporting system 220, via the transceiver 250, requesting a location of the first transport container 140. In response, the reporting system 220 determines a current (or last known) location of the first transport container 140, via location sensors, and transmits the location to the recipient or sender, via the transceiver 250. In some embodiments, the reporting system 220 determines the location of the first transport container 140 based at least in part on one or more location signals received via the transceiver 250.

In some aspects, the sensors and actuators 260 include one or more environmental sensors. The environmental sensors (for example, temperature sensors, humidity sensors, barometric pressure sensors, chemical sensors, or a combination thereof) determine environmental conditions of the first transport container 140. For example, the environmental sensors may be placed within the cavity 230 of the first transport container 140 and configured to detect the temperature, the humidity, the barometric pressure, a chemical, or a combination thereof. According to some embodiments, the reporting system 220 determines whether predetermined environmental conditions exist within the transport container. For example, when the first transport container 140 is transporting an object that requires a temperature below a set threshold, the reporting system 220 continuously determines the temperature within the cavity 230 of the first transport container 140, via environmental sensors, and transmits an alert signal when the temperature rises above the set threshold. In some embodiments, the first transport container 140 is configured to preserve the environmental conditions within the transport container 140. For example, the first transport container 140 may include thermal insulation, weatherproofing, heatsinks, or a combination thereof. In some embodiments, the first transport container 140 is configured to be airtight, for example, to maintain an inert atmosphere within the first transport container 140.

In some aspects, the sensors and actuators 260 include one or more movement sensors. The movement sensors (for example, an accelerometer, gyroscope, a magnetometer, an orientation sensor, or a combination thereof) detect movement of the first transport container 140. The ability to detect movement of the first transport container 140 provides a plurality of benefits. For example, while a normal level of movement is to be expected while the first transport container 140 is being transported, an excessive amount of movement (for example, movement caused by the first transport container 140 being dropped) may indicate mishandling. In some embodiments, the reporting system 220 uses movement sensors to detect when the amount of movement is above a set threshold and transmits an alert signal to, for example, the sender, the recipient, the shipping company, or any combination thereof. These alert signals may be used to determine the cause of damaged packages.

In some aspects, the sensors and actuators 260 include one or more audio sensors. The audio sensors (for example, a microphone) record noise present around the first transport container 140. For example, the audio sensors can record audio during a potential theft of the first transport container 140. The recorded audio can later be used to determine the identity of the party attempting to steal the first transport container 140. In some aspects, the sensors and actuators 260 include one or more image sensors. The image sensors (for example, a camera or Far Infrared sensor) records electromagnetic radiation incident upon the first transport container 140. For example, a camera can capture images periodically, or a camera can be trigged by a Far Infrared sensor detecting human proximity. Alternatively or additionally, image sensors can be used to determine one or more environmental conditions, for example, daylight cycles.

In some embodiments, the reporting system 220 determines and reports status information of the first transport container 140. Status information includes, without limitation, information associated with environmental conditions (detected by one or more of the plurality of sensors and actuators 260), the current state of the locking mechanism 215 (for example, locked or unlocked), the current state of the locking bar 217 (for example, locked or unlocked), a remaining state of charge for a battery, various reservoir levels, or a combination thereof. According to various embodiments, the reporting system 220 determines and reports a location of the first transport container 140. For example, the electronic processor 240 determines a location of the first transport container 140 based on information received from one or more of the plurality of sensors and actuators 260, and sends the determined location via the transceiver 250.

Figure 3:
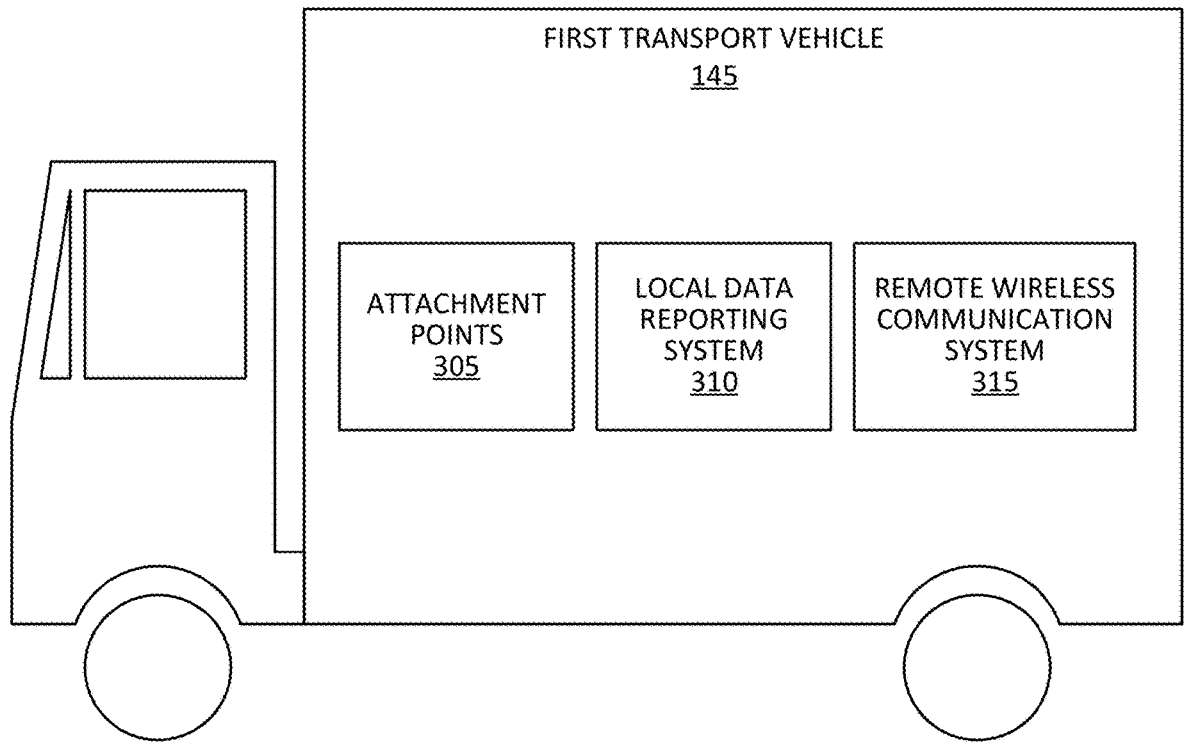
FIG. 3 illustrates a transport vehicle for use in the transportation system of FIG. 1, according to various embodiments of this disclosure.

FIG. 3 illustrates an example of a transport vehicle (for example, the first transport vehicle 145 of FIG. 1) according to various embodiments. The first transport vehicle 145 illustrated in FIG. 3 includes a plurality of attachment points 305, a local data reporting system 310, and a remote wireless communication system 315.

Referring to the non-limiting example of FIG. 3, the plurality of attachment points 305 are configured to store transport containers. In some embodiments, each of the plurality of attachment points 305 includes an anchor point for securing a transport container to the first transport vehicle 145 (for example, a bar). In such embodiments, a transport container can be secured to the anchor point of the attachment point via the locking bar 217. The locking bar 217 illustrated in FIG. 2A and the plurality of attachment points 305 provide, in certain embodiments, a mechanism for securing transport containers to (or storing transport containers in) the plurality of transport vehicles. The locking bar 217 and plurality of attachment points 305 can include any appropriate form of complementary locking structures (for example, clamps, hooks, levers, etc.). In addition, in some embodiments, the plurality of transport containers are securely attached to the plurality of attachment points 305 via magnet locks.

In some examples, the first transport vehicle 145 includes an electromechanical interface to couple or decouple the transport containers with the plurality of attachment points 305. For example, a first control command to the electromechanical interface activates a magnetic lock of a first attachment point of the attachment points 305 to couple the first transport container 140 to the first attachment point. As another example, a second control command to the electromechanical interface deactivates the magnetic lock to decouple the first transport container 140 from the first attachment point. In a particular aspect, the transport resource allocation server 115 is configured to send one or more control commands to the electromechanical interface. In a particular aspect, a vehicle communication interface of the first transport vehicle 145 is configured to receive one or more control commands, and the electromechanical interface is configured to couple or decouple transport containers responsive to the received control commands.

In some embodiments, the first transport vehicle 145 includes one or more sensors configured to detect a presence of the first transport container 140. For example, the first transport container 140 is securely attached and locked to the first transport vehicle 145. The presence of the first transport container 140 is verified by information from the sensors of the first transport vehicle 145. For example, the first transport container 140 includes a tag (e.g., a radio-frequency identification (RFID) tag, a NFC tag, or both), and the first transport vehicle 145 includes a tag reader (e.g., a RFID reader, a NFC reader, or both). The local data reporting system 310 receives information related to one or more tags detected by the tag reader.

The local data reporting system 310 receives data from each transport container of a plurality of transport containers. For example, the local data reporting system 310 receives data from the reporting system 220 of the first transport container 140 when the first transport container 140 is secured to one of the plurality of attachment points 305. Data includes, among other things, environmental data or statuses of the plurality of transport containers. In some embodiments, the local data reporting system 310 include components or combinations of different components, including all or some of the various components described above with respect to the reporting system 220 of the first transport container 140.

The remote wireless communication system 315 reports data to the transport resource allocation server 115 (for example, data received from transport containers, data received from the tag reader, or a combination thereof) and receives instructions detailing the routing of transport vehicles and the allocation of the plurality of attachment points 305. In some embodiments, the remote wireless communication system 315 include components or combinations of different components.

Figure 4:
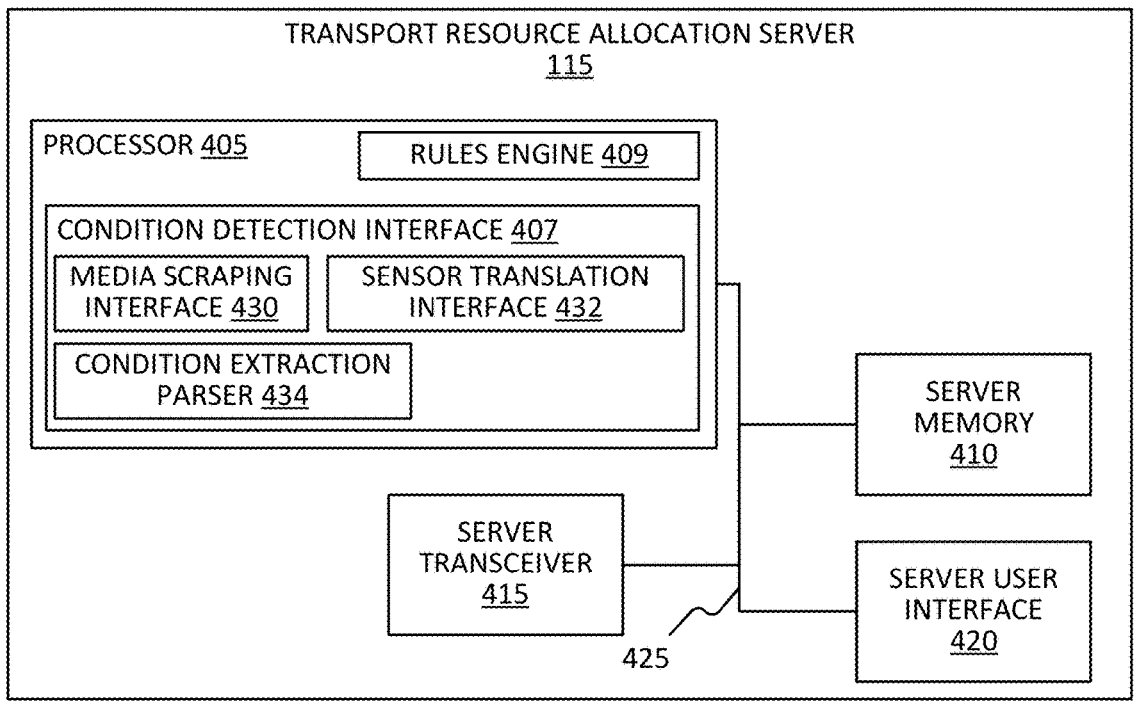
FIG. 4 illustrates a delivery management server included transportation system of FIG. 1, in accordance with some embodiments.

FIG. 4 illustrates an example of a transport resource allocation server 115 according to various embodiments of this disclosure. In the non-limiting example of FIG. 4, the transport resource allocation server 115 includes a processor 405, server memory 410, a server transceiver 415, and a server user interface 420. The processor 405, the server memory 410, as well as the other various modules are coupled by a bus 425, or are coupled directly, by one or more additional control or data buses, or a combination thereof. In other embodiments, the transport resource allocation server 115 may include fewer or additional components in configurations different from that illustrated in FIG. 4. The transport resource allocation server 115 includes the server transceiver 415 as an example of a delivery platform communication interface and as an example of a transmission system. In other implementations, the delivery platform communication interface includes the server transceiver 415, a receiver, a network interface, an antenna, another type of communication interface, or a combination thereof. In some implementations, the transmission system of the transport resource allocation server 115 includes the server transceiver 415, a transmitter, a network interface, an antenna, another type of communication interface, or a combination thereof.

The processor 405 includes a condition detection interface 407, a rules engine 409, or both. The condition detection interface 407 includes a media scraping interface 430, a sensor translation interface 432, a condition extraction parser 434, or a combination thereof. The media scraping interface 430 is configured to receive external notifications from published sources. For example, the media scraping interface 430 is configured to receive information regarding weather conditions, weather forecasts, traffic conditions, election results, sports news, or a combination thereof. In a particular aspect, one or more remote condition sensors are deployed in areas geographically separated from the transport resource allocation server 115. The sensor translation interface 432 is configured to receive external notifications from the remote condition sensors. The condition extraction parser 434 is configured to convert the external notifications received by the media scraping interface 430, the external notifications received by the sensor translation interface 432, or a combination thereof, into condition parameters. The rules engine 409 is configured to determine, based on the condition parameters, whether a specified condition is satisfied.

As an illustrative example, a delivery order indicates that during a particular time period (e.g., 1 year) a delivery operation is to be performed (e.g., a snack is to be delivered to a particular destination) on any day that a specified condition is satisfied. For example, the specified condition includes detecting a particular weather condition (e.g., rain) for more than a threshold duration (e.g., 30 minutes) in an area including the particular destination. In a particular aspect, the media scraping interface 430, the sensor translation interface 432, or both, receive a first external notification at a first time indicating that the particular weather condition (e.g., rain) is detected in the area. The media scraping interface 430, the sensor translation interface 432, or both, receive a second external notification at a second time indicating that the particular weather condition is detected in the area. The condition extraction parser 434, responsive to receipt of the first external notification, receipt of the second external notification, and a determination that the second time is within a threshold duration (e.g., 1 hour) of the first time, generates a condition parameter indicating that the particular weather condition has been detected from the first time to the second time in the area. The rules engine 509, based on a comparison of the condition parameter and the specified condition indicated by the delivery instructions 751, determines that the specified condition has been satisfied. The rules engine 509, in response to determining that the specified condition has been satisfied, generates a command to execute the delivery operation. For example, the command includes one or more movement commands to pick up a transport container, to place the object in the transport container, and to deliver the transport container to the particular destination.

The server memory 410 stores program instructions and data. The server memory 410 may include combinations of different types of memory, including the various types of memory described above with respect to the memory 245 included in the reporting system 220 of the first transport container 140. The processor 405 retrieves program instructions from the server memory 410 and executes the instructions to perform a set of functions including all or part of the methods described herein. The server transceiver 415 transmits signals to and receives signals from transport containers, transport vehicles, and other components included in the transportation system 100 of FIG. 1, such as through the communication network 125 or directly. In some embodiments, signals include, for example, data, data packets, or any combination thereof. The server user interface 420 includes any combination of digital and analog input devices required to achieve a desired level of control for the transport resource allocation server 115. For example, the server user interface 420 can include a computer having a display, a keyboard, a mouse, speakers, a microphone, a camera, and the like.

In some embodiments, the transport resource allocation server 115 interfaces with, or includes the transport order database 120 of FIG. 1. According to certain embodiments, the transport order database 120 includes data representing the identity and current status of components or combinations of different components, including all or some of the various components described above with respect to the transport resource allocation server 115. Additionally, the transport order database 120 includes data associating orders, transport containers, delivery operations, specified conditions triggering the performance of delivery operations, or a combination thereof.

In some embodiments, multiple transport containers are used to fulfill a single delivery order. For example, a delivery order indicates a first environmental profile (e.g., temperature above a first threshold) for a first item (e.g., an entrée) to be delivered and a second environmental profile (e.g., temperature below a second threshold) for a second item (e.g., ice cream) to be delivered. The transport resource allocation server 115 selects a first transport container 140 based on the first environmental profile and selects a second transport container 150 based on the second environmental profile. In a particular aspect, the transport resource allocation server 115 initiates transportation of the first transport container 140 to pick up the first item, transportation of the second transport container 150 to be pick up the second item, or both. In a particular aspect, the transport resource allocation server 115 initiates placement of the first transport container 140 and the second transport container 150 in the same transport vehicle for delivery to the final destination indicated in the delivery order. In a particular aspect, the transport resource allocation server 115 initiates performance of a service request on the first item, the second item, or both. For example, the transport resource allocation server 115 initiates heating or cooking of the first item within a threshold time of an expected delivery time of the first transport container 140.

In a particular example, the delivery order indicates that the same type of items (e.g., soup and bread) are to be delivered in multiple containers (e.g., individual servings). In a particular aspect, an item is previously prepared (e.g., cooked) or prepared in transit (e.g., at an intermediate attachment point or aboard a transport vehicle). In a particular aspect, the items are prepared collectively and apportioned into one or more transport containers for delivery.

According to certain embodiments, the transport resource allocation server 115 allocates transport vehicles based on transport orders. In general, a transport order can include a request to pick up an object from one location and transport the object to another location. The transport order is created, for example, in response to a customer ordering an object from a retailer. Alternatively, the transport order may be created, for example, in response to a business ordering a plurality of objects from a distributor. Further, the transport order may be created as a division of another order. For example, a first transport order is created responsive to a business ordering a first plurality of objects from a distributor. A second transport order and a third transport order are created from the first transport order responsive to the distributor ordering a second plurality of objects from a first supplier and a third plurality of objects from a second supplier, the second and third pluralities of objects comprising portions of the first plurality of objects.

Figure 5:
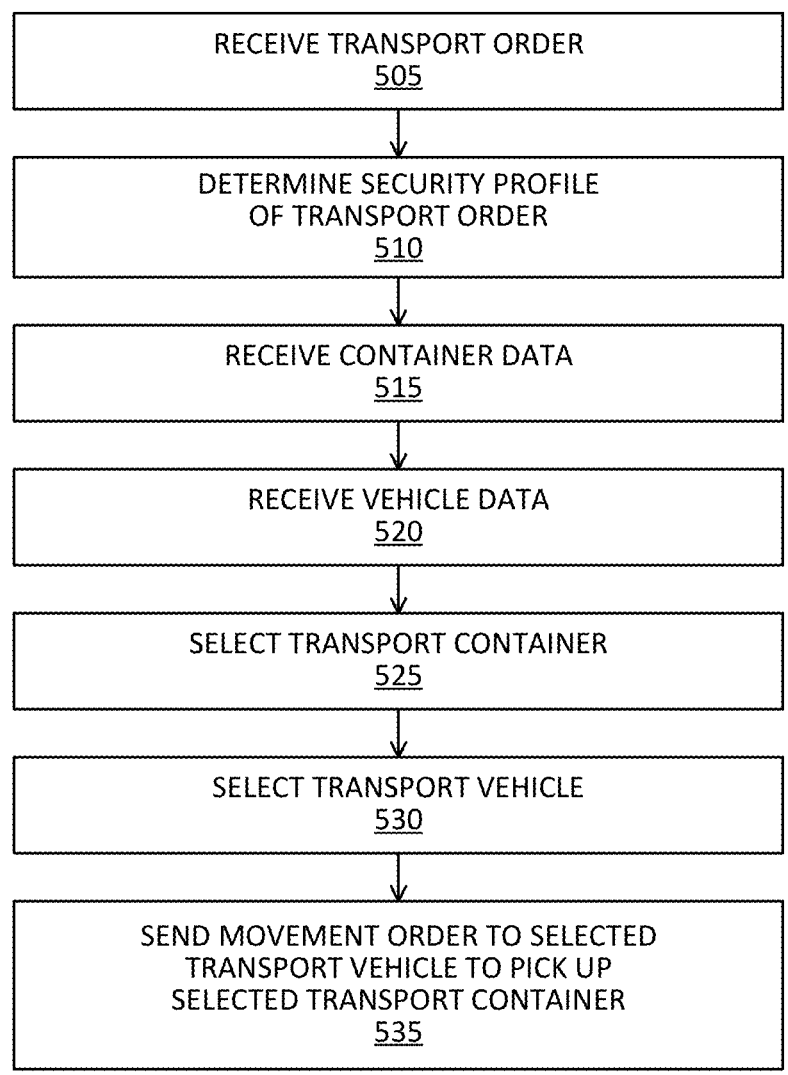
FIG. 5 illustrates operations of a method of allocating transport vehicles in the transportation system of FIG. 1, according to various embodiments of this disclosure.

FIG. 5 illustrates operations of a method 500 of allocating, by a transport resource allocation server 115, transport vehicles for moving transport containers based on transport orders, according to certain embodiments of this disclosure. Referring to the non-limiting example of FIG. 5, the method 500 includes the transport resource allocation server 115 receiving a transport order (at block 505). In some embodiments, the transport resource allocation server 115 receives the transport order over the communication network 125 from the transport order database 120.

In some embodiments, the transport order indicates locations (for example, an object pick-up location and/or an object drop-off location), a time attribute of the transportation (for example, an expected pick-up and/or delivery timeframe), attributes of an object to be transported (for example, size, weight, monetary value, and an environmental profile), or a combination thereof. The environmental profile indicates, for example, temperature requirements, humidity requirements, barometric pressure requirements, chemical requirements, fragility requirements, and motion requirements. In some embodiments, the transport order also includes sender information (for example, the sender's name or customer number), recipient information (for example, the recipient's name or customer number), or both.

At block 510, the transport resource allocation server 115 determines a security profile of the transport order. The security profile includes the environmental profile discussed above, anti-theft requirements, monitoring requirements, or a combination thereof.

In certain embodiments according to this disclosure, anti-theft requirements include requirements related to the security of transport containers against unauthorized access and removal of objects being transported. In some embodiments, the security profile indicates anti-theft requirements such as the minimum acceptable grade of the locking mechanism 215, the minimum acceptable grade of the locking bar 217, and the level of security required to unlock the locking mechanism 215 (for example, code entry, biometric, retina scanning, facial recognition, or a combination thereof).

In a particular example, at a first level of security, only a possession factor (e.g. a key or RFID tag) is required to unlock the locking mechanism 215. At a second level of security, a knowledge factor (e.g. a password, pin, or pattern) is required to unlock the locking mechanism 215. At a third level of security, an inherency factor (e.g. biometric or retina scanning) is required to unlock locking mechanism 215. At a fourth level of security, at least two factors are required to unlock locking mechanism 215. The fourth level may require similar factors (e.g. inherency factors), or may require dissimilar factors (e.g. a knowledge factor and a possession factor).

Anti-theft requirements can also include requirements related to the security of the transport vehicles against unauthorized access and removal of transport containers being transported. In some embodiments, the security profile indicates anti-theft requirements such as the minimal acceptable grade of anchor point that must be included in each of the plurality of attachment points 305.

In certain embodiments according to this disclosure, monitoring requirements include environmental condition monitoring requirements. For example, the environmental profile can indicate that the object being transported requires constant temperature monitoring. Monitoring requirements can also include location monitoring requirements. For example, the security profile can indicate that the current location of the object being transported needs to be reported on demand. In some embodiments, the monitoring requirements are directly related to the transport containers, the transport vehicles, or both. For example, the environmental profile can indicate that an object being transported can only be transported in a transport container that includes temperature sensors. As a further example, the security profile can indicate that an object being transported can only be transported in a transport vehicle that includes location sensors.

In some embodiments, the transport order indicates the security profile, the environmental profile, or both. In various embodiments according to this disclosure, the transport resource allocation server 115 determines the security profile, the environmental profile, or both, of the transport order based in part on information included the transport order. In some embodiments, the transport resource allocation server 115 determines anti-theft requirements for the security profile based the data included in the transport order (e.g., data indicating the monetary value of the object being transported). For example, an object flagged as having a high value will have greater anti-theft requirements than an object indicated as being of lesser monetary value. Further examples of objects triggering higher anti-theft requirements include, without limitation, prescription medications (for example, prescription medicines with psychotropic properties) or irreplaceable personal items (e.g., heirlooms).

In a particular aspect, the transport resource allocation server 115 determines anti-theft requirements based on sender or recipient information included in the transport order. For example, the transport resource allocation server 115 may determine that all transport orders for a specific recipient require a high amount of anti-theft requirements and monitoring requirements, regardless of the monetary value of the object being transported. In another example, the delivery order includes information associated with a drug prescription, and satisfaction of a specified condition is based in part on detecting from a medical record, that a delivery of a drug is indicated by the drug prescription.

Returning to the illustrative example of FIG. 5, at block 515, the transport resource allocation server 115 receives container data from the transport containers. The container data indicates a location for each transport container. For example, the container data can include an address of a building in which the first transport container 140 is currently located or last detected. The container data can further indicate the locations of transport containers within a building. For example, the container data can indicate a specific room or part of the building where the first transport container 140 is located.

According to certain embodiments, the container data includes security features of each transport container such as anti-theft features, monitoring features, environmental features, or a combination thereof. Additionally, in certain embodiments, the container data comprises data regarding the status or availability of a transport container, which can be maintained as a calendar or other temporal data structure. Additionally, the container data includes, without limitation, data regarding analytical metrics pertaining to the transport container itself, such as a unitized cost to operate the transport container. Anti-theft features include, for example, the complexity of the locking mechanism 215 and the amount of security required to unlock the locking mechanism 215 in each transport container. Monitoring features include, for example, the quantity or quality of different sensors included in each transport container. For example, the container data can indicate that the first transport container 140 includes sensors which determine and report environmental conditions of the first transport container 140 such as location, temperature, motion, or a combination thereof.

Environmental features include, for example, temperature regulation, humidity regulation, barometric pressure regulation, movement regulation, chemical regulation (e.g., sealing capabilities), or a combination thereof. For example, the container data can indicate that the first transport container 140 is configured to regulate the temperature within the cavity 230. As a further example, the container data can indicate that the second transport container 150 is configured to regulate temperature and humidity. As an additional example, the container data can indicate that the third transport container 160 is configured to regulate motion of objects being transported. For example, the third transport container may include one or more reaction wheels, momentum wheels, or control moment gyroscopes. As another example, the container data can indicate that the fourth transport container 160 is configured to seal (e.g., a watertight seal, a hermetic seal, or both) the objects being transported.

According to various embodiments, the container data includes sizes of each transport container. For example, the container data indicates, among other things, the outer dimensions of each transport container, the dimensions of the cavity 230 within each transport container, or both.

At block 520, the transport resource allocation server 115 receives vehicle data from the transport vehicles. The vehicle data includes a location for each of the transport vehicles. For example, the vehicle data can include a street address near the current location (or a last detected location) of the first transport vehicle 145. If a transport vehicle is moving, the vehicle data can indicate its current location (or a last detected location), traveling speed, and a destination location.

The vehicle data also indicates the capabilities of each of the transport vehicles. For example, the vehicle data can indicate the total quantity of attachment points for securing transport containers included in (or currently available in) each of the transport vehicles.

In some embodiments, the vehicle data also indicates security features of each transport vehicle. In some embodiments, security features include anti-theft features, monitoring features, environmental features, or a combination thereof. Additionally, in certain embodiments, the vehicle data comprises data regarding the status or availability of a transport vehicle, which can be maintained as a calendar or other temporal data structure. Additionally, the vehicle data includes, without limitation, data regarding analytical metrics pertaining to the transport vehicle itself, such as a unitized cost to operate the transport vehicle. Anti-theft features include, for example, the complexity of anchors included in the plurality of attachment points 305 and the amount of security required to release a transport container from an attachment point. Monitoring features include, for example, the quantity or quality of sensors included in each transport vehicle. For example, the vehicle data can indicate that the first transport vehicle 145 includes sensors that determine and report environmental conditions of the first transport vehicle 145 such as location, temperature, movement, or a combination thereof. Environmental features include, for example, temperature regulation, humidity regulation, barometric pressure regulation, chemical regulation, movement regulation, or a combination thereof. For example, the vehicle data can indicate that the first transport vehicle 145 is configured to regulate the temperature within a cargo hold.

At block 525, the transport resource allocation server 115 selects one of the plurality of transport containers to carry out the transport order. In some embodiments, the transport resource allocation server 115 selects one of the plurality of transport containers based in part on the security profile of the transport order and the security features of the plurality of transport containers included in the container data. For example, the transport resource allocation server 115 may select the first transport container 140 because the locking mechanism 215 of the first transport container 140 is compliant with anti-theft requirements included in the security profile of the transport order. As a further example, the transport resource allocation server 115 may select the second transport container 150 because the security profile of the transport order requires constant location reporting and the second transport container 150 is configured to determine and report its location on demand. As an additional example, the transport resource allocation server 115 may select the third transport container 160 because the third transport container 160 is configured to refrigerate the cavity 230 and the security profile (e.g., the environmental profile) of the transport order indicates that the object being transported is perishable and needs to be kept below a temperature of 35 degrees.

In some embodiments, the transport resource allocation server 115 additionally selects one of the plurality of transport containers to carry out the transport order based on the locations and sizes of each of the plurality of transport containers. For example, when the first transport container 140 and the second transport container 150 both have security features that are compliant with the security profile of the transport order, the transport resource allocation server 115 may select the first transport container 140 over the second transport container 150 because the first transport container 140 is located closer to the pick-up location than the second transport container 150.

At block 530, the transport resource allocation server 115 selects a transport vehicle to carry out the transport order. In some embodiments, the transport resource allocation server 115 selects the transport vehicle based in part on the security profile of the transport order and the security features of the transport vehicle, which can be included as part of the vehicle data. For example, the transport resource allocation server 115 may select the first transport vehicle 145 because the plurality of attachment points 305 of the first transport vehicle 145 are compliant with anti-theft requirements included in the security profile of the transport order. As a further example, the transport resource allocation server 115 may select the second transport vehicle 147 because the security profile of the profile of the transport order requires constant location reporting and the second transport vehicle 147 is configured to determine and report its location on demand.

In some embodiments, at block 530, the transport resource allocation server 115 selects a transport vehicle to carry out the transport order based on data indicating the locations and capabilities of each of a plurality of transport vehicles. For example, when the second transport vehicle 147 and the third transport vehicle 155 both have security features that are compliant with the security profile of the transport order, the transport resource allocation server 115 may select the third transport vehicle 155 over the second transport vehicle 147 because the third transport vehicle 155 is located closer to the pick-up location than the second transport vehicle 147. As an additional example, when the first transport vehicle 145 and the third transport vehicle 155 both have security features that are compliant with the security profile of the transport order, the transport resource allocation server 115 may select the first transport vehicle 145 over the third transport vehicle 155 because the first transport vehicle 145 has an available attachment point to allocate to the selected transport container and the attachment point(s) of the third transport vehicle 155 are all occupied or allocated to other transport containers.

In some embodiments, the selected transport vehicle may not perform all of the delivery tasks associated with the entire transport order. For example, the selected transport vehicle may transport the selected transport container from a starting location to an intermediate location and another transport vehicle may transport the selected transport container from the intermediate location to a destination location of the transport order.

At block 535, the transport resource allocation server 115 sends a movement order to the selected transport vehicle to pick up the selected transport container. In some embodiments, the movement order includes an order to move the selected transport vehicle from its current location to the location of the selected transport container. For example, when the selected transport container is located at a first location and the selected transport vehicle is located at a second location, the movement order can include an order to move the selected transport vehicle from the second location to the first location in order to pick up the selected transport container. In certain embodiments, the movement order includes an order to alter the current driving route of the selected transport vehicle. For example, when the selected transport vehicle is traveling to a first location, the movement order can include an order to detour to a second location where the selected transport container is located, or add the second location as a new stop after the stopping at the first location.

Referring to the non-limiting example of FIG. 5, the movement order includes an order to place the selected transport container in the selected transport vehicle. For example, when the selected transport vehicle and the selected transport container are both located at the same facility, the movement order can include an order to place the selected transport container in the selected transport vehicle. As a further example, when the selected transport vehicle is traveling to the location of the selected transport container to pick another transport container, the movement order can include an order to place the selected transport container on the selected transport vehicle along with one or more other transport containers.

In certain embodiments according to this disclosure, the transport container is designated as having a fixed location, and the movement order further includes an order to deliver, to the transport container, an item to be placed in the transport container. According to various embodiments, the movement order further includes an order to receive an item at the transport container.

In some embodiments, at block 530, the transport resource allocation server 115 selects a transport vehicle to carry out the transport order based on one or more previously transmitted movement orders. For example, when the first transport vehicle 145 is traveling to a location to pick up another transport container based on a movement order, the transport resource allocation server 115 may select the first transport vehicle 145 to also pick up the selected transport container when the two transport containers are located with a predetermined distance of each other. For example, the two transport containers can be located next to each other, at the same storage facility, at separate nearby storage facilities, in the same neighborhood, or in the same city.

Given the potential for different combinations of security features among transport containers, it may be difficult for certain users of transportation system 100 (for example, a small retailer) to store every possible type of transport container at their facilities. As described above, the transportation system 100 can allocate transport vehicles to move the plurality of transport containers based on transport orders. However, when the plurality of transport containers are not located (or stored) at the locations where objects to be transported are picked-up, additional time is needed to transport the plurality of transport containers to the pick-up locations. Thus, in some embodiments, the transportation system 100 allocates transport vehicles to move transport containers based on container need.

Figure 6:
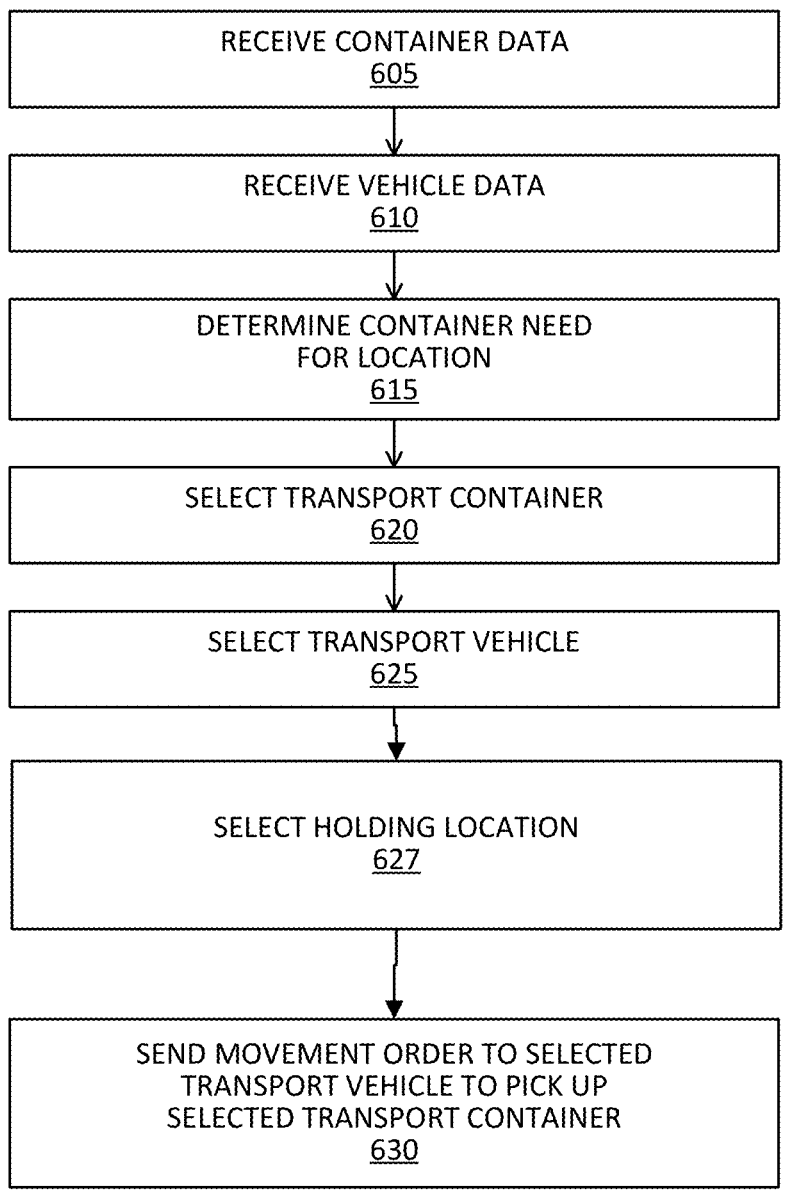
FIG. 6 illustrates operations of a method of allocating transport vehicles in the transportation system of FIG. 1, according to certain embodiments of this disclosure.

FIG. 6 illustrates operations of a method 600 of allocating transport vehicles for moving transport containers based on container need according to certain embodiments of this disclosure. Referring to the non-limiting example of FIG. 6, at block 605, a transport resource allocation server 115 receives container data from transport containers. The container data includes, among other things, locations, security features, and sizes of each of a set of transport containers whose operation is managed, at least in part, by transport resource allocation server 115, as described above in relation to block 515 in FIG. 5.

In various embodiments, at block 610, the transport resource allocation server 115 receives vehicle data from transport vehicles. The vehicle data includes, among other things, locations, capabilities, and security features of the transport vehicles, as described above in relation to block 520 in FIG. 5.

As shown in the non-limiting example of FIG. 6, at block 615, the transport resource allocation server 115 determines a container need for a location (for example, a first location). The container need indicates a need for transport containers with specific attributes at the first location. The first location can include, for example, a storage warehouse of a product manufacturer or retailer. The specific attributes of transport containers needed at the first location are represented in a security profile included in the container need. The security profile can include environmental requirements, anti-theft requirements, and monitoring requirements, as discussed above in relation to block 510 in FIG. 5. In some embodiments, the container need indicates a quantity of transport containers needed at the first location. For example, the container need can indicate that three transport containers with a specific security profile are needed at the first location. In some embodiments, the container need indicates that a transport container is designated as having a fixed location.

According to various embodiments, at block 615, the transport resource allocation server 115 determines the container need based in part on the container data. For example, the transport resource allocation server 115 determines a quantity of the transport containers located at the first location based in part on the container data. The transport resource allocation server 115 then determines the container need of the first location based in part on the quantity of the transport containers located at the first location. For example, when two transport containers with a specific security profiles are located at the first location and a total of five transport containers with the specific security profile are needed at the first location, the transport resource allocation server 115 determines a container need of the first location for three transport containers with the specific security profile.

In some embodiments, at block 615, the transport resource allocation server 115 determines the container need of the first location based in part on one or more transport orders. For example, the transport resource allocation server 115 may receive a transport order including the first location and a plurality of attributes of an object to be transported. In some such embodiments, the transport resource allocation server 115 determines the container need of the first location based on the one or more of the plurality of attributes of the object to be transported that are included in the transport order. In some embodiments, the transport resource allocation server 115 determines the container need of the first location based on a plurality of previously received transport orders. For example, based on a plurality of previously received transport orders, the transport resource allocation server 115 may determine that a great number of objects requiring refrigeration are picked-up from the first location at the beginning of every month. Thus, the transport resource allocation server 115 may determine that the first location needs to have a set number of transport containers with refrigeration capabilities at the start of every month.

In various embodiments, at block 620, the transport resource allocation server 115, selects one of the plurality of transport containers based on in part on the security profile of the container need and the security features of the plurality of transport containers included in the container data.

At block 625, the transport resource allocation server 115 selects a transport vehicle to move the selected transport container to the first location. In some embodiments, the transport resource allocation server 115 selects a transport vehicle based in part on the vehicle data, the security profile, or both.

Referring to the non-limiting example of FIG. 6, at block 627, the transport resource allocation server 115 selects a holding location (for example, docking attachment point 110 in FIG. 1) as a staging location for holding the transport container pending satisfaction of a specified condition. In a particular aspect, the holding location is selected based on geographical proximity to the final delivery destination. Upon receiving data notifying the relevant actor(s) within transportation system 100 (for example, a transport container or delivery vehicle) that the delivery condition has been satisfied, the delivery process resumes, and remaining delivery operations (for example, releasing the transport container from an attachment point, unlocking the container) are performed.

At block 630, the transport resource allocation server 115 sends a movement order to the selected transport vehicle to pick up the selected transport container. The movement order can include one or more of the movement order described above in relation to block 535 in FIG. 5. For example, in some embodiments, a movement order includes an order to deliver, to the transport container, an item to be contained in a transport container, the transport container designated as having a fixed location.

Figure 7A:
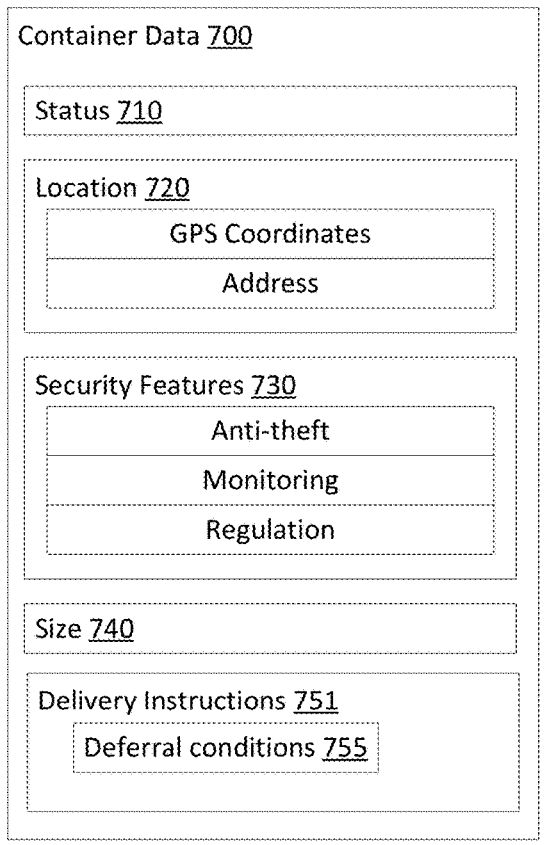
FIG. 7A illustrates an example of a data structure associated with container data according to certain embodiments of this disclosure.

FIG. 7A illustrates a data structure for container data 700 according to various embodiments of this disclosure. Referring to the non-limiting example of FIG. 7A, the container data 700 can include data indicating a status 710 of the container (for example, an operational state or condition, e.g., in-use, idle, offline, etc.), data indicating a location 720 of the container, data indicating security features 730 of the container, data indicating a size 740 of the container, and data associated with delivery instructions 751 for the container. The data associated with the location 720 includes the GPS coordinates and street or building address of the container. According to various embodiments, the data indicating the security features 730 include anti-theft features, monitoring features, and regulation features. The data associated with the size 740 may include one or more dimensions of the container, such as an outer dimension, radius, height, or the like.

According to certain embodiments, the container data 700 further comprises data associated with delivery instructions 751 for the container. According to various embodiments, delivery instructions 751 include, without limitation, data specifying storage conditions (e.g., environmental conditions) to be maintained within the container, security parameters (for example, authentication operations required before a container can be opened), and digital evidence (for example, entries to be added to a block chain, distributed ledger or other trusted data format) of the container having been loaded, delivered or otherwise made subject to a delivery operation.

As illustrated by the non-limiting example of FIG. 7A, the delivery instructions 751 comprise deferral conditions 755. According to certain embodiments, the deferral conditions 755 comprise data representing (for example, in a markup language) gating conditions for the performance of delivery operations. As an example, the deferral conditions 755 comprise an operation:condition pair, indicating that the specified delivery operation is not to be performed until the specified condition is satisfied. To illustrate, the deferral condition 755 can include an operation:date pair, in which case the operation specified in the operation value of the operation:date pair is not be performed until a date specified in the date value of the operation:date pair.

Figure 7B:
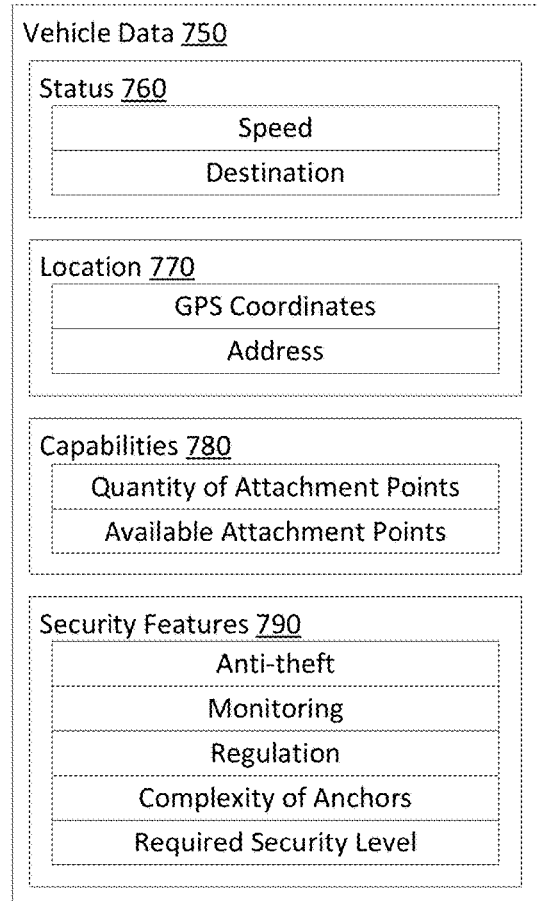
FIG. 7B illustrates an example of a data structure associated with vehicle data, according to some embodiments of this disclosure.

FIG. 7B illustrates an example of a data structure for vehicle data 750 according to certain embodiments of this disclosure. As shown in the non-limiting example of FIG. 7B, the vehicle data 750 includes data indicating a status 760 (for example, an operational state or condition, e.g., in-use, idle, offline, etc.) of a vehicle (e.g., the first transport vehicle 145), data indicating a location 770 of the vehicle, data associated with the capabilities 780 of the vehicle, and data specifying the security features 790 of the vehicle. In certain embodiments, the data showing the status 760 of the vehicle (e.g., a delivery vehicle) includes a speed of the vehicle and a current or future destination of the vehicle. In various embodiments according to this disclosure, data specifying the location 770 of the vehicle includes GPS coordinates, a street or building address, or the like. Data showing the capabilities 780 of the vehicle includes, in certain embodiments, data showing a quantity of attachment points included on the vehicle and a quantity of available attachment points. In some embodiments, data indicating the security features 790 includes data specifying anti-theft features, monitoring features, regulation features, anchor complexity, and security levels provided by the vehicle.

Figure 8:
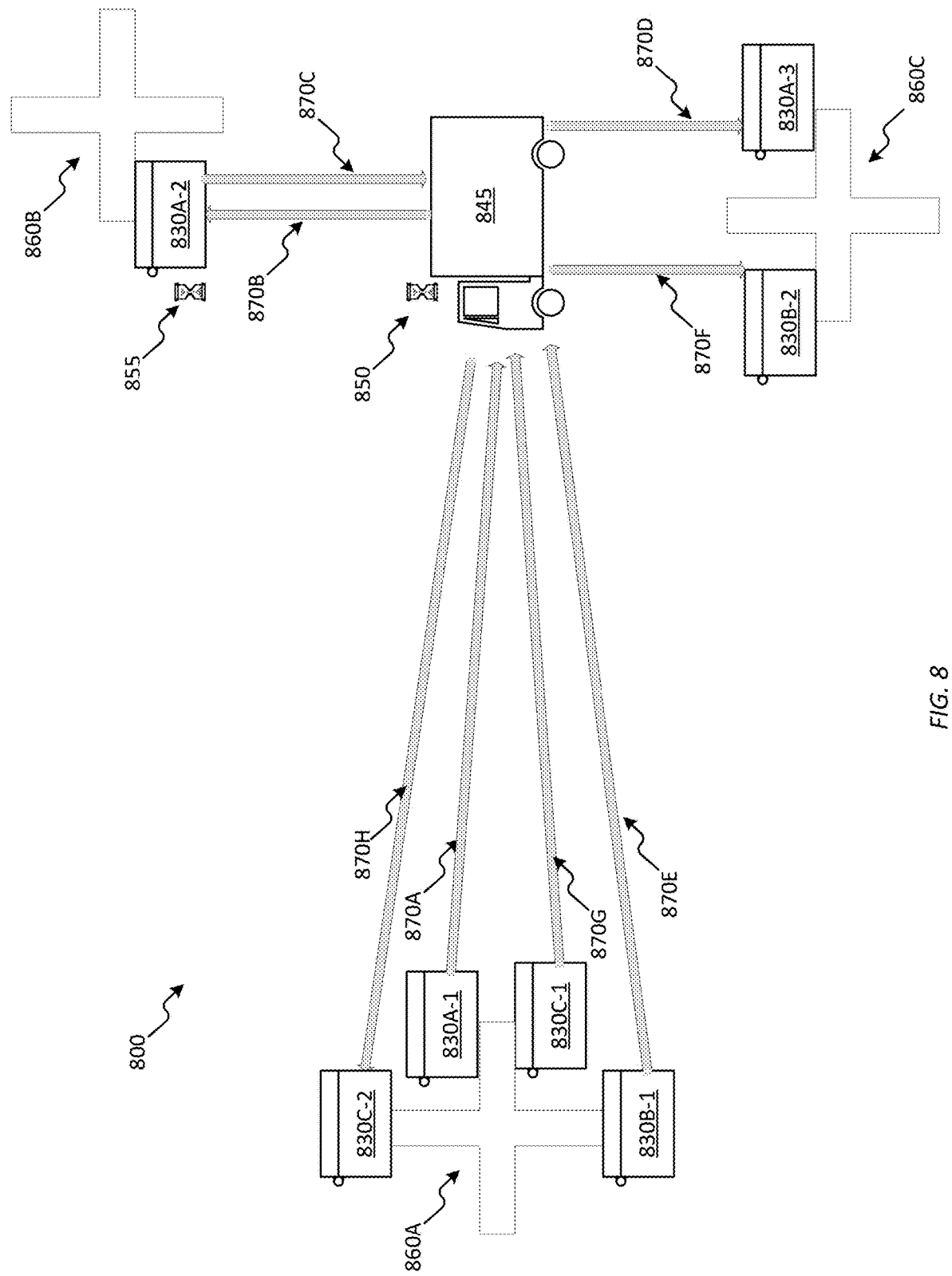
FIG. 8 is an example movement diagram reflecting various modes of conditional delivery using elements of the transportation system of FIG. 1, according to some embodiments.

FIG. 8 is an example movement diagram reflecting various modes of conditional delivery using elements of the transportation system of FIG. 1, according to some embodiments. Referring to the non-limiting example of FIG. 8, a transportation system 800 utilizes components described with respect to FIG. 1. FIG. 8 illustrates three exemplary scenarios in which a delivery order is executed such that performance of one or more delivery operations are deferred until a specified condition is satisfied.

In a first scenario, a transport container 830A (represented at three different times in the delivery process as 830A-1, 830A-2, and 830A-3) moves through the transportation system 800. In this example, conditional delivery of the transport container 830A is achieved by holding the transport container 830A-2 after retrieval from a reception point 860A for a period of time 855 at an intermediate attachment point 860B.

The transportation system 800 receives an item for delivery and handling according to specified conditions via secured transport container 830A-1. In this example, the secured transport container 830A-1 is received (e.g., picked up) at a reception point 860A by a delivery vehicle 845. The parameters of the delivery are determined and transmitted to the delivery vehicle 845 and the transport container 830A-1 via an orchestration platform (for example, the transport resource allocation server 115 of FIG. 1). The delivery vehicle 845 is associated with (e.g., under control of) a delivery management server (e.g., the transport resource allocation server 115 of FIG. 1). The delivery management server receives a delivery order indicating a future condition and including instructions to defer delivery until the specified condition is satisfied (e.g., the passage of the time 855). Delivery by a delivery vehicle 845 to a delivery attachment point 860C is deferred until detection that the specified condition is satisfied. Responsive to the detection that the specified condition has been satisfied, the delivery management server transmits, to a delivery vehicle 845 (e.g., an autonomous delivery vehicle), an instruction to perform delivery of the transport container 830A to a delivery attachment point 860C.

According to various embodiments of this disclosure, in a first delivery scenario, deferring delivery of the transport container 830A until the specified condition is satisfied includes instructing anchored storage at a reception point (e.g., intermediate attachment point 860B) to have environmental parameters within ranges compatible with the handling parameters indicated by a delivery order for the object. For example, the transport order indicates the handling parameters for controlling environmental conditions of the object until the specified condition is satisfied.

According to certain embodiments, the delivery vehicle 845 performs a first transportation leg 870A and a second transportation leg 870B to move the transport container 830A-1 from the reception point 860A to the intermediate attachment point 860B, where the transport container 830A is labeled as transport container 830A-2. Responsive to a specified condition being satisfied, such as the passage of a time 855, the delivery management server transmits to a delivery vehicle 845 (e.g., an autonomous delivery vehicle), an instruction to perform delivery of the transport container 830A-2 (e.g., a secure package container) to a delivery attachment point 860C through a third transport leg 870C and a fourth transport leg 870D. While in this explanatory example, the first transport leg 870A and the second transport leg 870B are shown separately, the first transport leg 870A and the second transport leg 870B could be parts of a single trip. Similarly, while the third transport leg 870C and the fourth transport leg 870D are shown separately, the third transport leg 870C and the fourth transport leg 870D could also be part of a single trip. In a particular aspect, the transport container 830A is labeled as a transport container 830A-3 at the delivery attachment point 860C.

In a second scenario, (represented by transport containers 830B-1 and 830B-2, which represent a single transport container 830B at different stages of a delivery process), conditional delivery is achieved by the transportation system 800 through holding the transport container 830B-1 for a period of time 850 on a delivery vehicle 845 after a pickup operation 870E. In this example, one or more items for handling and delivery under controlled conditions to a delivery attachment point 860C are received (e.g., picked up) in a secured transport container 830B-1 at a reception point 860A by a delivery vehicle 845. The delivery vehicle 845 is associated with (e.g., under control of) a delivery management server (e.g., the transport resource allocation server 115 of FIG. 1).

The delivery management server receives a delivery order indicating a specified condition, such as the passage of a time 850. In certain embodiments, the delivery order includes instructions to defer delivery until the specified condition is satisfied. The delivery vehicle 845, under direction of the delivery management server defers delivery until the specified condition is satisfied. Responsive to the specified condition being satisfied (e.g., the passage of time 850), the delivery management server transmits to an autonomous delivery vehicle, such as delivery vehicle 845, an instruction to perform delivery of the transport container 830B (e.g., a secure package container) to the delivery attachment point 860C, where the transport container 830B is labeled as the transport container 830B-2.

In a third scenario (represented by transport containers 830C-1 and 830C-2, which depict a single transport container at two different times as it moves through the transport system 800), conditional delivery is achieved by transportation system 800 through holding a transport container 830C-1 for a period of time 850 on a delivery vehicle 845 after a pickup operation 870G and then returning a transport container 830C-2 via a delivery operation 870H to the same reception point 860A from which transport container 830C was originally extracted. The delivery vehicle 845 receives (e.g., picks up) at a reception point 860A in a transport container 830C-1 (e.g., a secured delivery container) one or more items for handling and delivery under controlled conditions to the reception point 860A. The delivery vehicle 845 is associated with (e.g., under control of) a delivery management server (e.g., the transport resource allocation server 115 of FIG. 1). The delivery management server receives a delivery order indicating a future condition, such as the passage of time 850. In some embodiments, the delivery order includes instructions to defer delivery until the specified condition is satisfied. The delivery vehicle 845, under direction of the delivery management server, defers delivery until detection that the specified condition is satisfied. The delivery management server, responsive to the detection that the specified condition is satisfied (e.g., passage of the time 850), transmits to an autonomous delivery vehicle, such as the delivery vehicle 845, an instruction to perform delivery of the transport container 830C (e.g., a secure transport container) to the reception point 860A. In a particular aspect, the transport container 830C is labeled as a transport container 830C-2 upon delivery to the reception point 860A.

In a particular aspect, each of the reception point 860A, the delivery attachment point 860B, and the delivery attachment point 860C receives a transport container (e.g., the transport container 830A, 830B, or 830C) from the same delivery vehicle 845. In an alternative aspect, at least one of the delivery attachment points 860A, 860B, or 860C receives a transport container (e.g., the transport container 830A, 830B, or 830C) from the delivery vehicle 845 and another one of the delivery attachment points 860A, 860B, or 860C receives the same transport container from another delivery vehicle that is distinct from the delivery vehicle 845.

Figure 9:
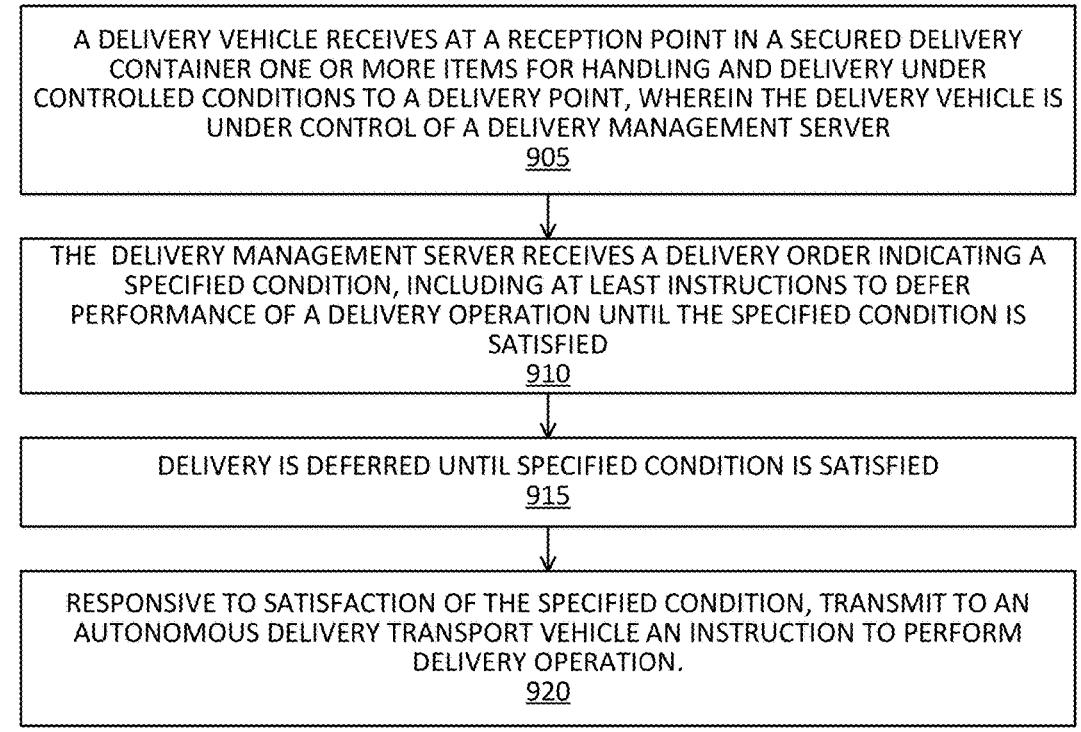
FIG. 9 illustrates operations of an example of a method for conditional delivery, according to some embodiments.

FIG. 9 illustrates operations of a method 900 for conditional delivery, according to various embodiments of this disclosure. Referring to the non-limiting example of FIG. 9, at block 905, a delivery vehicle receives (e.g., picks up), at a reception point, one or more items for handling and delivery under controlled conditions to a delivery point in a secured delivery container. Further, according to certain embodiments, the delivery vehicle is associated with (e.g., under control) of a delivery management server.

In some embodiments, at block 910, the delivery management server receives a delivery order indicating a specified condition, and the delivery order includes one or more pieces of data comprising instructions to defer delivery until the specified condition is satisfied. At block 915, delivery is deferred until a delivery management server detects that the specified condition is satisfied. At block 920, responsive to detecting that the specified condition has been satisfied, the delivery management server transmits an instruction to perform delivery of the secure package container to an autonomous delivery vehicle.

Figure 10:
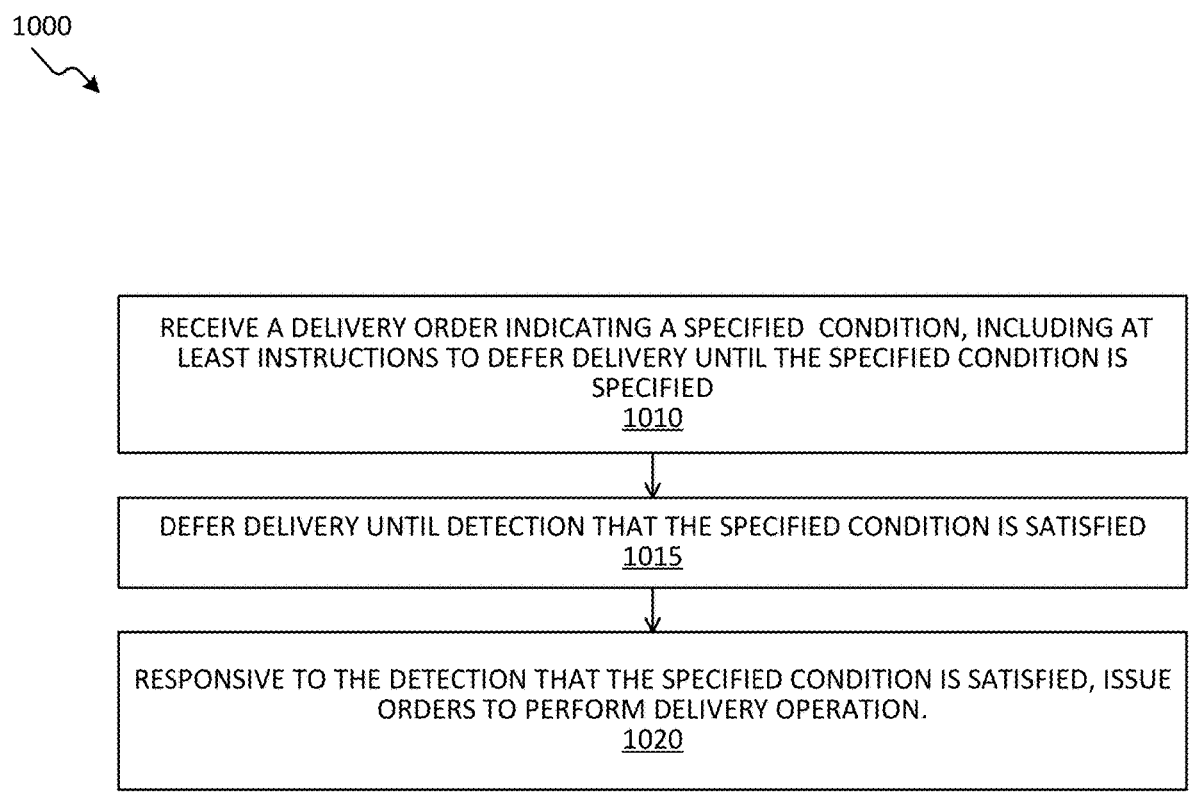
FIG. 10 illustrates operations of an example of a method for conditional delivery, according to some embodiments.

FIG. 10 illustrates operations of a method 1000 for conditional delivery according to various embodiments of this disclosure. Referring to the non-limiting example of FIG. 10, at block 1010, a delivery order indicating a future condition, including at least instructions to defer delivery until the specified condition is satisfied, is received. At block 1015, defer delivery until detection that the specified condition is satisfied. At block 1020, responsive to the detection that the specified condition is satisfied, orders are issued to perform delivery of the secure package container.

Figure 11:
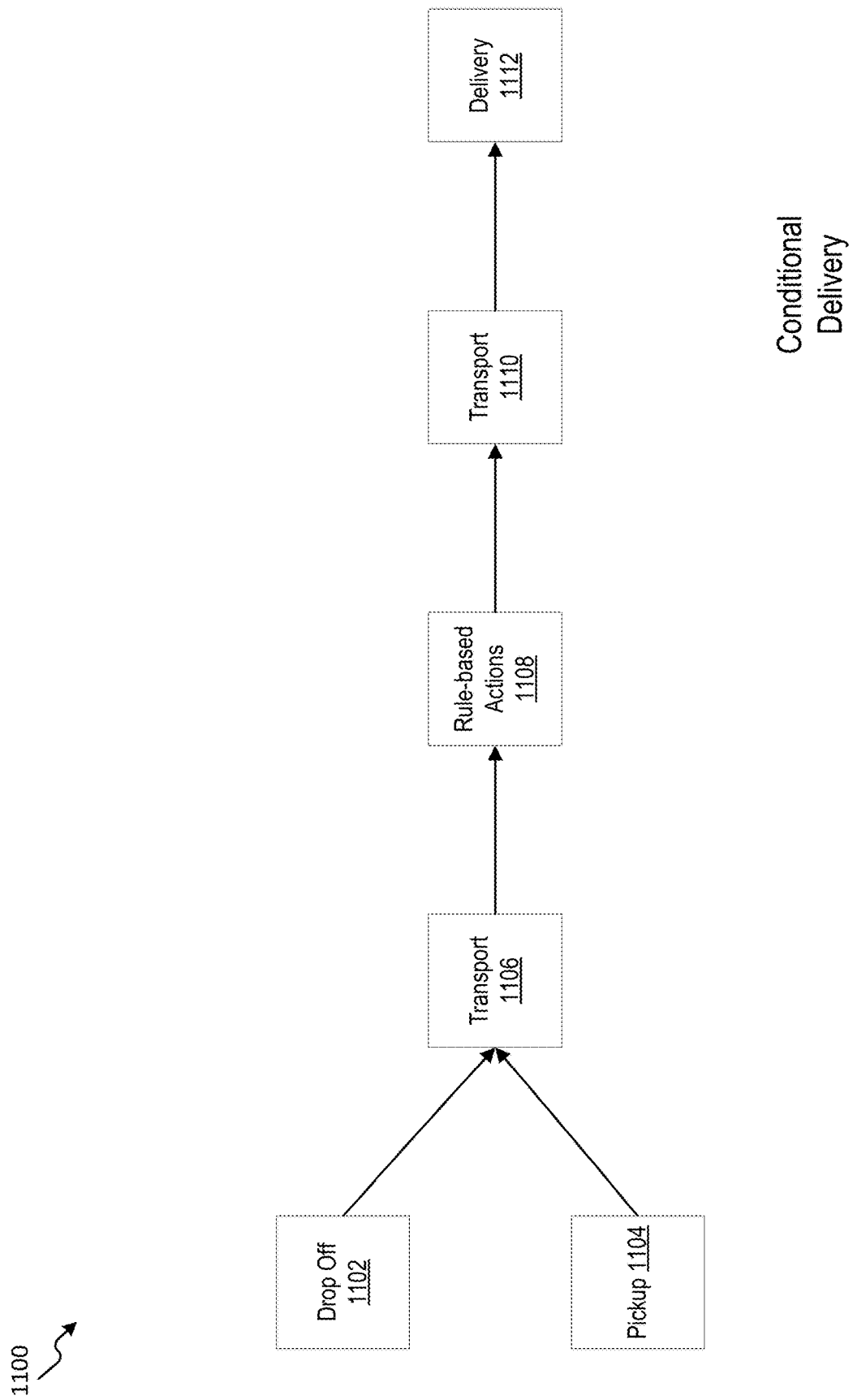
FIG. 11 illustrates operations of an example of a method for conditional delivery, according to some embodiments.

Referring to FIG. 11, an example of a method for conditional delivery is shown and generally designated 1100. The transport resource allocation server 115 determines that an object is to be dropped off or has been dropped off at a drop-off location (at block 1102). For example, the transport resource allocation server 115 receives a transport order over the communication network 125 from the transport order database 120. The transport order indicates the drop-off location, a drop-off time, or both, for an object that is to be transported. Alternatively, the transport resource allocation server 115 determines that an object is to be picked up from a pick-up location (at block 1104). For example, the transport order indicates the pick-up location, a pick-up time, or both, for an object to be transported. In a particular aspect, the reception point 860A corresponds to the drop-off location or the pick-up location.

The transport resource allocation server 115 selects a transport container (e.g., the first transport container 140) to perform at least part of the transport order, as described with reference to FIG. 5. For example, the transport resource allocation server 115 selects the first transport container 140 based on a security profile (e.g., the environmental profile) indicated by the transport order, security features of the first transport container 140, a location of the transport container 140, a location of the reception point 860A, or a combination thereof.

The transport resource allocation server 115 selects a transport vehicle to perform at least part of the transport order, as described with reference to FIG. 5. For example, the transport resource allocation server 115 selects the first transport vehicle 145 based on the security profile (e.g., the environmental profile) indicated by the transport order, the security features of the first transport vehicle 145, a location of the first transport vehicle 145, an availability of an attachment point of the first transport vehicle 145, a location of the reception point 860A, or a combination thereof.

At block 1106, the transport resource allocation server 115 initiates transportation of the object using the selected transport container (e.g., the first transport container 140) and the selected transport vehicle (e.g., the first transport vehicle 145), as described with reference to FIG. 5. For example, the transport resource allocation server 115 sends to the first transport vehicle 145 a first movement order to go to the location of the first transport container 140, a second movement order to place the first transport container 140 in the first transport vehicle 145, a third movement order to transport the first transport container 140 to the reception point 860A, a fourth movement order to place the object in the first transport container 140, a fifth movement order to transport the object in the first transport container 140 to a destination, or a combination thereof. The destination could be a destination for the object indicated in the transport order or an intermediate destination (e.g., a holding location, as described with reference to FIG. 6).

In a particular aspect, the transport resource allocation server 115 sends one or more movement orders to the first transport container 140 concurrently with sending one or more movement orders to the first transport vehicle 145. For example, the transport resource allocation server 115 transmits a sixth movement order to the first transport container 140 to receive the object in the first transport container 140.

The transport resource allocation server 115 initiates performance of one or more rule-based actions (at block 1108). In a particular example, the first transport container 140 is kept at a holding location, such as a docking attachment point 110, a reception point 860A, the attachment point 860B, one of the attachment points 305 of the first transport vehicle 145, the delivery vehicle 845, or a combination thereof until a specified condition is satisfied. To illustrate, a rules engine (e.g., the processor 405) of the transport resource allocation server 115 determines whether a specified condition indicated by the delivery instructions 751 is satisfied. The rules engine includes program code that, when executed by the processor 405, causes the rules engine to, responsive to determining whether the specified condition is satisfied, determine service actions for handling of the first transport container 140 until satisfaction of the specified condition. For example, the service actions include storing the first transport container 140 at a holding location (e.g., a reception point 860A) that satisfies one or more storage parameters.

In a particular aspect, the storage parameters are based at least in part on a determination of a minimum expected delivery time for the first transport container 140. For example, the delivery instructions 751 indicate that a temperature of the object is to be maintained below a temperature threshold. The container data 700 of the first transport container 140 includes security features 730 indicating that the first transport container 140 is capable of maintaining an internal temperature below the temperature threshold for a first duration (e.g., 3 hours). The transport resource allocation server 115 determines the storage parameters based on the first duration. For example, the transport resource allocation server 115, in response to determining that the minimum expected delivery time (e.g., 4 hours) is greater than the first duration (e.g., 3 hours), selects storage parameters that include the ability (e.g., refrigeration) to maintain the temperature below the temperature threshold for at least the minimum expected delivery time. In a particular aspect, the storage parameters are based at least in part on a value of a parameter associated with security of the first transport container 140, as described with reference to FIG. 5.

In a particular aspect, deferring the performance of the delivery operation includes transmitting, from the transport resource allocation server 115 to the first transport vehicle 145, instructions to route the first transport container 140 to a delivery target (e.g., a destination) on a route determined to provide continuous transportation on the first transport vehicle 145 until the specified condition is satisfied. For example, the delivery instructions 751 indicate that an object (e.g., flowers and balloons) are to be delivered to a particular destination upon satisfaction of a specified condition (e.g., a particular contestant wins an election). The first transport vehicle 145 could be assigned to make deliveries in an area that includes the particular destination. The transport resource allocation server 115 transmits instructions to the first transport vehicle 145, instructions to route the first transport container 140 (e.g., carrying the flowers and balloons) to the delivery target (e.g., the particular destination) on a route (e.g., around the area) to provide continuous transportation on the first transport vehicle 145 until the specified condition is satisfied. In a particular aspect, the media scraping interface 430 of FIG. 4 receives an external notification indicating a result of the election. The rules engine 409, in response to determining that the external notification indicates that the particular contestant won the election, generates a command to deliver the first transport container 140. The transport resource allocation server 115 sends the command to the first transport vehicle 145. The first transport vehicle 145, responsive to receiving the command, delivers the first transport container 140 at the particular destination. Alternatively, the rules engine 409, in response to determining that a second specified condition is satisfied (e.g., another contestant won the election), generates a command to route the first transport container 140 to another location. In a particular example, the rules engine 409 generates the command to route the first transport container 140 for return to the reception point 860A. In another example, the rules engine 409 generates the command to route the first transport container 140 to a second destination associated with the other contestant who won the election.

In a particular aspect, the rules engine 409 determines a delivery target (e.g., a first destination associated with a first contestant or a second destination associated with a second contestant) based on a delivery target rule indicated by the delivery instructions 751 of a delivery order. For example, the delivery target rule indicates that the object (e.g., the flowers and balloons) is to be delivered to a destination associated with a contestant who wins the election. In a particular aspect, the transport resource allocation server 115 sends a notification to a device associated with the delivery target (e.g., a contestant or a destination associated with the contestant) to indicate that the object is to be delivered. The transport resource allocation server 115 receives a performance request or a return request responsive to the notification. For example, the contestant may refuse delivery of the object and send a return request responsive to the notification. The transport resource allocation server 115, responsive to receiving the return request, generates a command routing the first transport container 140 for return to the reception point 860A. As another example, the contestant may accept delivery of the object and send a performance request responsive to the notification. The transport resource allocation server 115, responsive to receiving the performance request, generates a command routing the first transport container 140 to a destination associated with the contestant.

In a particular aspect, the performance request, the delivery instructions 751, or both, may indicate one or more delivery conditions. For example, the delivery conditions indicate that a service is to be performed on the object. To illustrate, the delivery conditions indicate that the balloons have to be filled with helium. The rules engine 409, responsive to determining that the delivery conditions are satisfied, generates a command routing the first transport container 140 to a destination associated with the contestant.

The transport resource allocation server 115 sends the command to the first transport vehicle 145. At block 1110, the first transport vehicle 145 transports the first transport container 140 to the destination indicated by the command. At block 1112, the first transport vehicle 145 delivers the first transport container 140 to the location indicated by the command.

In a particular aspect, the transport resource allocation server 115 updates an entry in a distributed ledger in response to determining that a specified condition is satisfied, determining that the command has been sent to the first transport vehicle 145, or both. In a particular aspect, the command includes instructions to update the distributed ledger upon receipt of the command, upon delivery of the first transport container 140, or both. In this aspect, the first transport container 140 updates the entry in the distributed ledger in response to receiving the command, in response to delivery the first transport container 140, or both. Some additional examples of conditional delivery are further described with reference to FIGS. 12-16.

Figure 12:
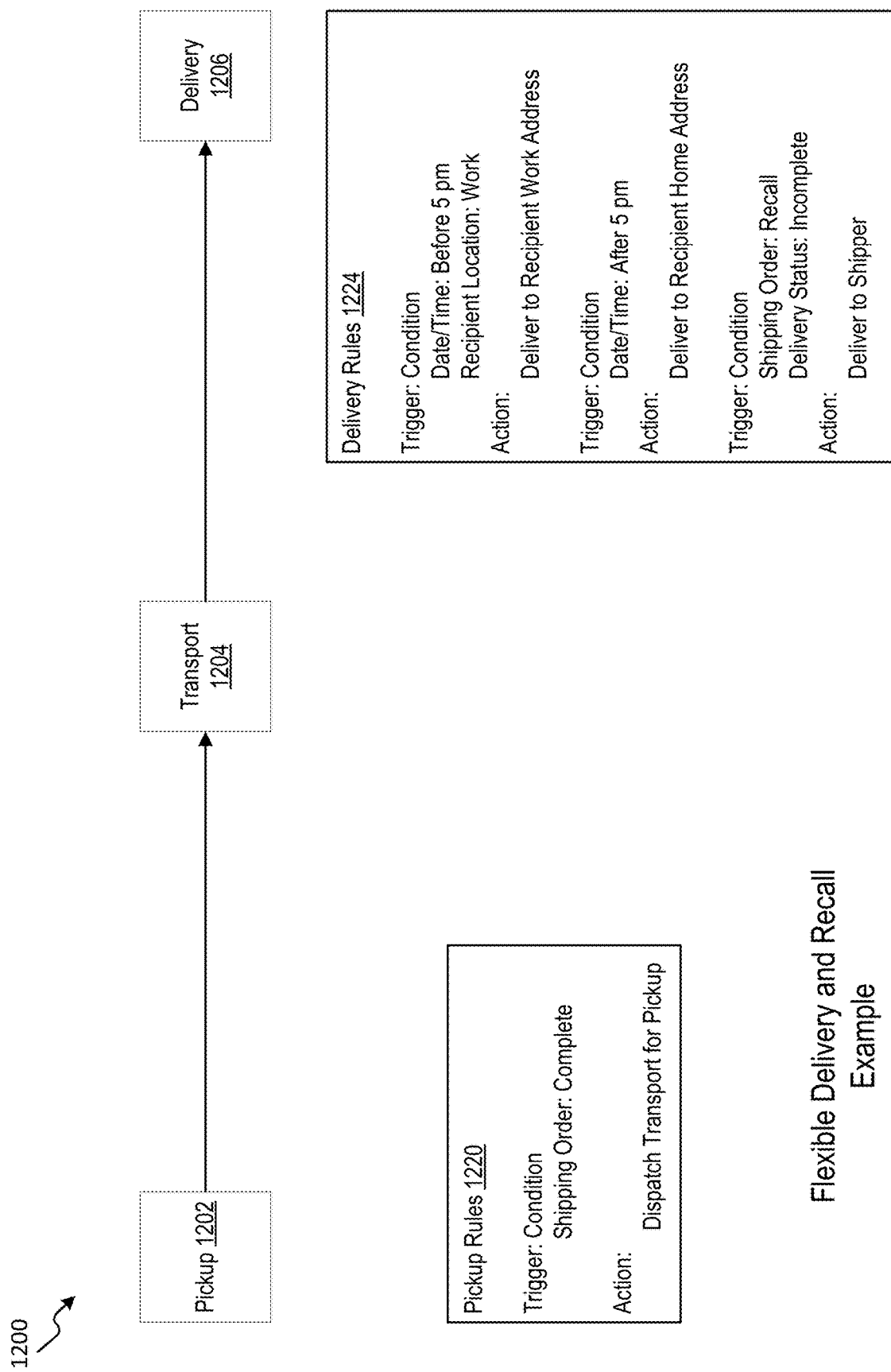
FIG. 12 illustrates operations of an example of a method for conditional delivery, according to some embodiments.

Referring to FIG. 12, an example of a method for conditional delivery is shown and generally designated 1200. The transport resource allocation server 115 determines that an object is to be picked up from a pick-up location (at block 1202). For example, a shipping order indicates that an object is to be picked up from the reception point 860A of FIG. 8. In a particular aspect, the shipping order indicates one or more pickup rules 1220. For example, the pickup rules 1220 indicate a condition (e.g., shipping order is complete) that activates a trigger and an action (e.g., dispatch transport for pickup) that is to be performed when the trigger is activated.

The shipping order also indicates one or more delivery rules 1224. For example, the shipping order indicates a plurality of conditions that activate various triggers and indicates actions that are to be performed when a corresponding trigger is activated. For example, the delivery rules 1224 indicate that a first condition (e.g., expected delivery time before 5 PM and a location of a recipient detected at work) activates a first trigger, and a first action (e.g., delivery to recipient work address) is to be performed when the first trigger is activated.

As another example, the delivery rules 1224 indicate that a second condition (e.g., expected delivery time after 5 PM) activates a second trigger, and a second action (e.g., delivery to recipient home address) is to be performed when the second trigger is activated. In a particular example, the delivery rules 1224 indicate that a third condition (e.g., receipt of a recall request prior to completion of delivery) activates a third trigger, and a third action (e.g., delivery to shipper) is to be performed when the third trigger is activated.

The transport resource allocation server 115 initiates transportation of the first transport container 140 (at block 1204). For example, the rules engine 409, in response to determining that a condition (e.g., shipping order is complete) indicated by the pickup rules 1220 is satisfied, initiates performance of a corresponding action (e.g., dispatching transport for pickup). To illustrate, the transport resource allocation server 115 selects the first transport container 140 and the first transport vehicle 145, as described herein. The transport resource allocation server 115 sends a command to the first transport vehicle 145 to pick up the first transport container 140, to go to the reception point 860A, to place the object in the first transport container 140, or a combination thereof.

In a particular aspect, the rules engine 409 determines a first expected delivery time of the first transport container 140 to a first location (e.g., recipient work address) and a second expected delivery time of the first transport container 140 to a second location (e.g., recipient home address). The rules engine 409 determines, based on the first expected delivery time and the second expected delivery time, that a particular condition of the delivery rules 1224 is likely to be satisfied. The rules engine 409 generates a command in preparation of performance of an action corresponding to the particular condition that is likely to be satisfied. For example, the rules engine 409 generates a command to route the first transport container 140 to the first location in response to determining that a corresponding condition (e.g., first expected delivery time before 5 pm on a workday when the recipient is expected to be at work at the first expected delivery time) is likely to be satisfied. Alternatively, the rules engine 409 generates a command to route the first transport container 140 to the second location in response to determining that a corresponding condition (e.g., first expected delivery time after 5 pm or the recipient is not expected to be at work at the first expected delivery time) is likely to be satisfied. The transport resource allocation server 115 sends the command to the first transport vehicle 145.

In a particular aspect, the transport resource allocation server 115 receives a recall request. The rules engine 409, in response to receipt of the recall request and a determining that delivery of the first transport container 140 has not been completed, generates a command to route the first transport container 140 to a sender address, the reception point 860A, or another location. The transport resource allocation server 115 sends the command to the first transport vehicle 145.

The method 1200 thus enables conditional delivery of the first transport container 140 to a particular location based on an expected delivery time and a recipient location. The method 1200 also enables the first transport container 140 to be recalled prior to delivery.

Figure 13:
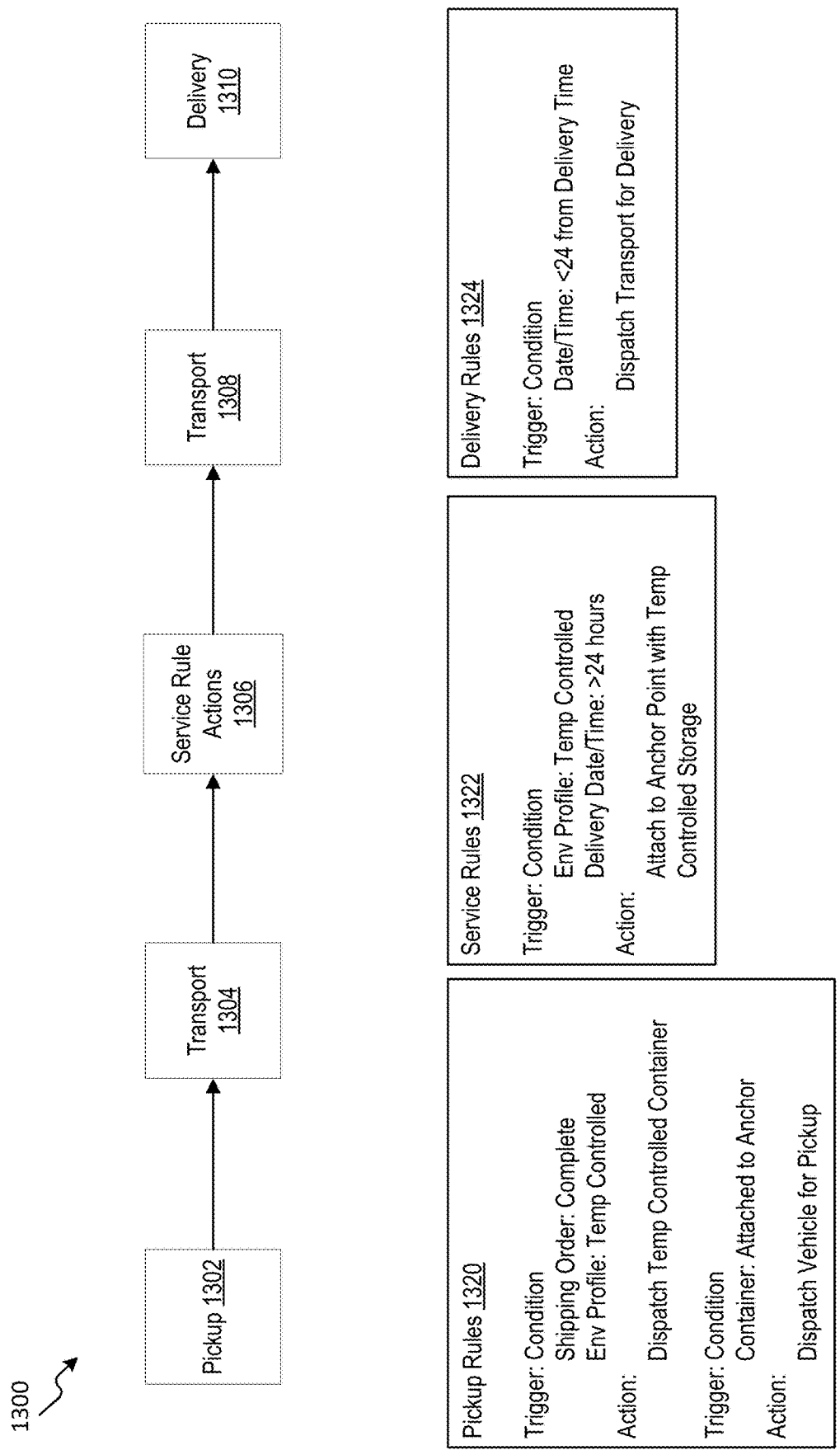
FIG. 13 illustrates operations of an example of a method for conditional delivery, according to some embodiments.

Referring to FIG. 13, an example of a method for conditional delivery is shown and generally designated 1300. A shipping order indicates one or more pickup rules 1320, one or more service rules 1322, one or more delivery rules 1324, or a combination thereof. Each of the rules indicated by the shipping order indicates a condition and an action to be performed responsive to the condition being satisfied. The shipping order indicates a pickup location (e.g., a reception point 860A).

The transport resource allocation server 115 initiates, based on the pickup rules 1320, pickup of an object to be delivered (at block 1302). The rules engine 409, in response to receiving the shipping order, determines that a first condition (e.g., shipping order is complete) indicated by a first pickup rule of the pickup rules 1320 is satisfied. The rules engine 409, in response to determining that the first condition is satisfied, performs a corresponding first action by selecting the first transport container 140 based on an environmental profile (e.g., temperature controlled) and generates a command for transportation of the first transport container 140 to the reception point 860A. For example, the rules engine 409 selects a delivery vehicle to pick up the first transport container 140 from a first location and move the first transport container 140 to a second location and sends the command to the selected delivery vehicle. In a particular example, the first transport container 140 may be moved from location to location by various delivery vehicles until reaching the reception point 860A.

The rules engine 409, in response to receiving the container data 700 indicating that the first transport container 140 is attached to an anchor point, determines that a second condition indicated by a second pickup rule of the pickup rules 1320 is satisfied. The rules engine 409, in response to determining that the second condition is satisfied, initiates pickup and transportation by the first transport vehicle 145 of the first transport container 140 from the reception point 860A (at block 1304).

At block 1306, the rules engine 409 initiates one or more service rule actions based on the service rules 1322. For example, the rules engine 409 determines that a condition indicated by the service rules 1322 is satisfied in response to determining that the first transport container 140 is to be kept at a holding location (e.g., the attachment point 860B of FIG. 8), that an estimated delivery time is greater than a threshold duration (e.g., 24 hours), and that the shipping order indicates an environmental profile. The rules engine 409, in response to determining that the condition indicated by the service rules 1322, initiates performance of the corresponding action. For example, the rules engine 409 generates a command indicating that the first transport container 140 is to be attached to an anchor point (e.g., with temperature-controlled storage) that satisfies the environmental profile. The rules engine 409 sends the command to the first transport vehicle 145.

The rules engine 409 determines that a condition indicated by the delivery rules 1324 is satisfied in response to determining, at a time, that the time is less than a threshold duration (e.g., 24 hours) from the expected delivery time. The rules engine 409, in response to determining that the condition indicated by the delivery rules 1324 is satisfied, initiates performance of a corresponding action. For example, the rules engine 409 generates a command to pick up the first transport container 140 from the holding location and deliver the first transport container 140 to a delivery destination indicated by the shipping order. The transport resource allocation server 115 sends the command to a delivery vehicle. The delivery vehicle, responsive to the command, transports the first transport container 140 (at block 1308) and delivers the first transport container 140 at the delivery destination (at block 1310).

The method 1300 thus enables conditional storage of the first transport container 140 in an environment-controlled (e.g., temperature-controlled) storage. For example, the first transport container 140 is stored in the environment-controlled storage based on a remaining time until the expected delivery time.

Figure 14:
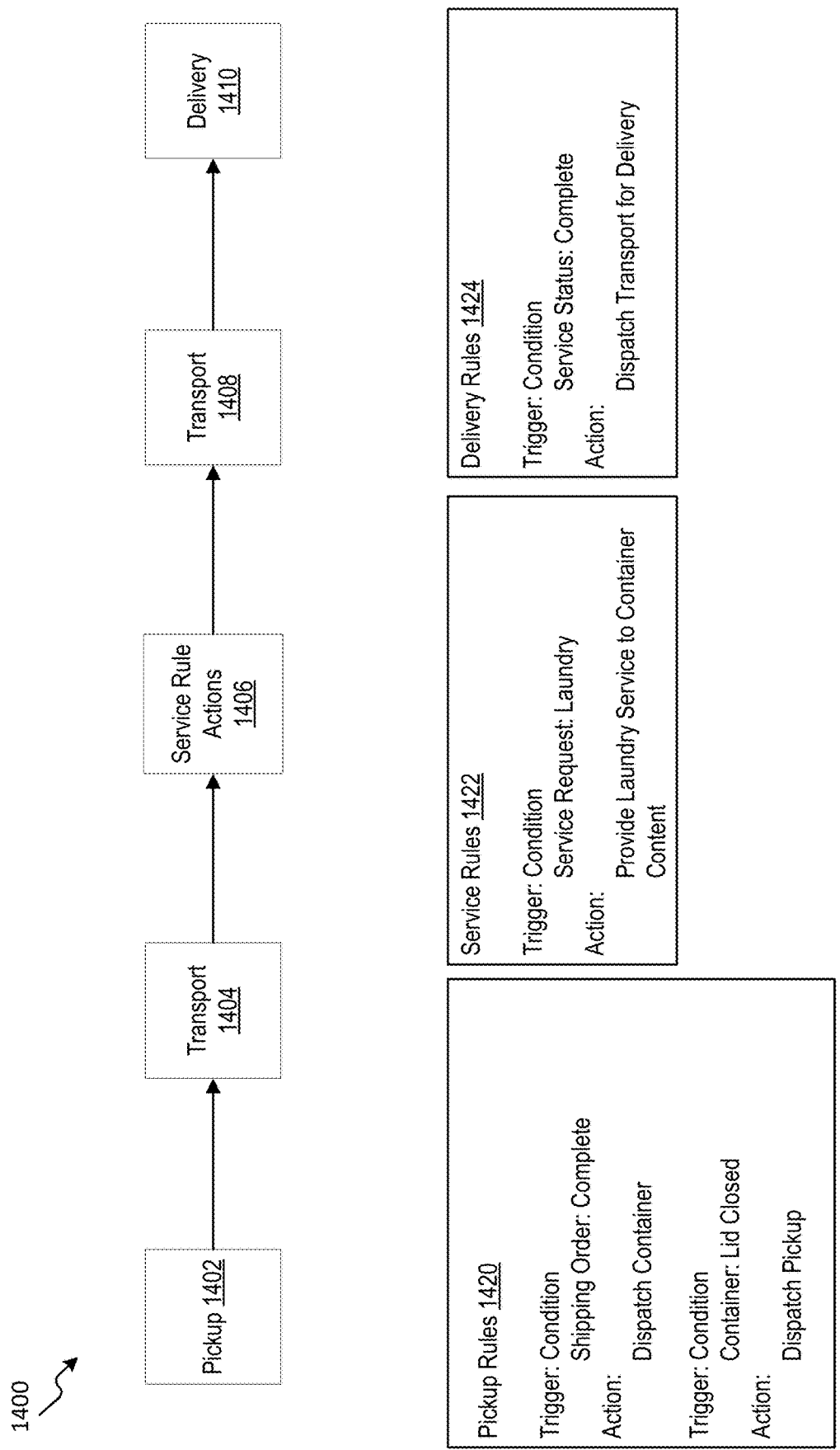
FIG. 14 illustrates operations of an example of a method for conditional delivery, according to some embodiments.

Referring to FIG. 14, an example of a method for conditional delivery is shown and generally designated 1400. A shipping order indicates one or more pickup rules 1420, one or more service rules 1422, one or more delivery rules 1424, or a combination thereof.

The transport resource allocation server 115 initiates pickup based on the pickup rules 1420 (at block 1402). For example, the transport resource allocation server 115, in response to receiving a completed shipping order, initiates transportation of the first transport container 140 to a pickup location (e.g., a reception point 860A). The transport resource allocation server 115, in response to determining that a cover 210 (e.g., a lid) of the first transport container 140 is closed, initiates pick up, by the first transport vehicle 145, of the first transport container 140 with one or more objects to be shipped. The first transport vehicle 145 transports the first transport container 140 (at block 1404). In a particular aspect, the first transport vehicle 145 transports the first transport container 140 to an intermediate attachment point 860B. In another aspect, the first transport container 140 is kept on the first transport vehicle 145 from pickup to delivery.

The transport resource allocation server 115 initiates performance of one or more services based on the service rules 1422 (at block 1406). For example, the transport resource allocation server 115 initiates a laundry service to clean contents of the first transport container 140. In a particular aspect, the laundry service is performed on the first transport vehicle 145. In an alternative aspect, the laundry service is performed outside the first transport vehicle 145. For example, the first transport container 140 is removed from the first transport vehicle 145 for performing the laundry service.

In a particular aspect, the laundry service is performed within the first transport container 140. For example, the service is performed on the contents of the first transport container 140 without removing the contents from the first transport container 140. In another aspect, the contents of the first transport container 140 are removed from the first transport container 140 during at least part of the performance of the service and placed back in the first transport container 140. The first transport container 140 is available for delivery after completion of the laundry.

The transport resource allocation server 115 initiates transportation of the first transport container 140 for delivery based on the delivery rules 1424 (at block 1408). For example, the transport resource allocation server 115 initiates transportation of the first transport container 140 by the first transport vehicle 145 or another transport vehicle to a delivery location indicated by the shipping order. The transport resource allocation server 115 initiates delivery of the first transport container 140 (at block 1410). For example, the first transport container 140 is detached from the first transport vehicle 145 (or another transport vehicle) in response to a command from the transport resource allocation server 115. The method 1400 thus enables conditional performance of services on contents of transport containers.

Figure 15:
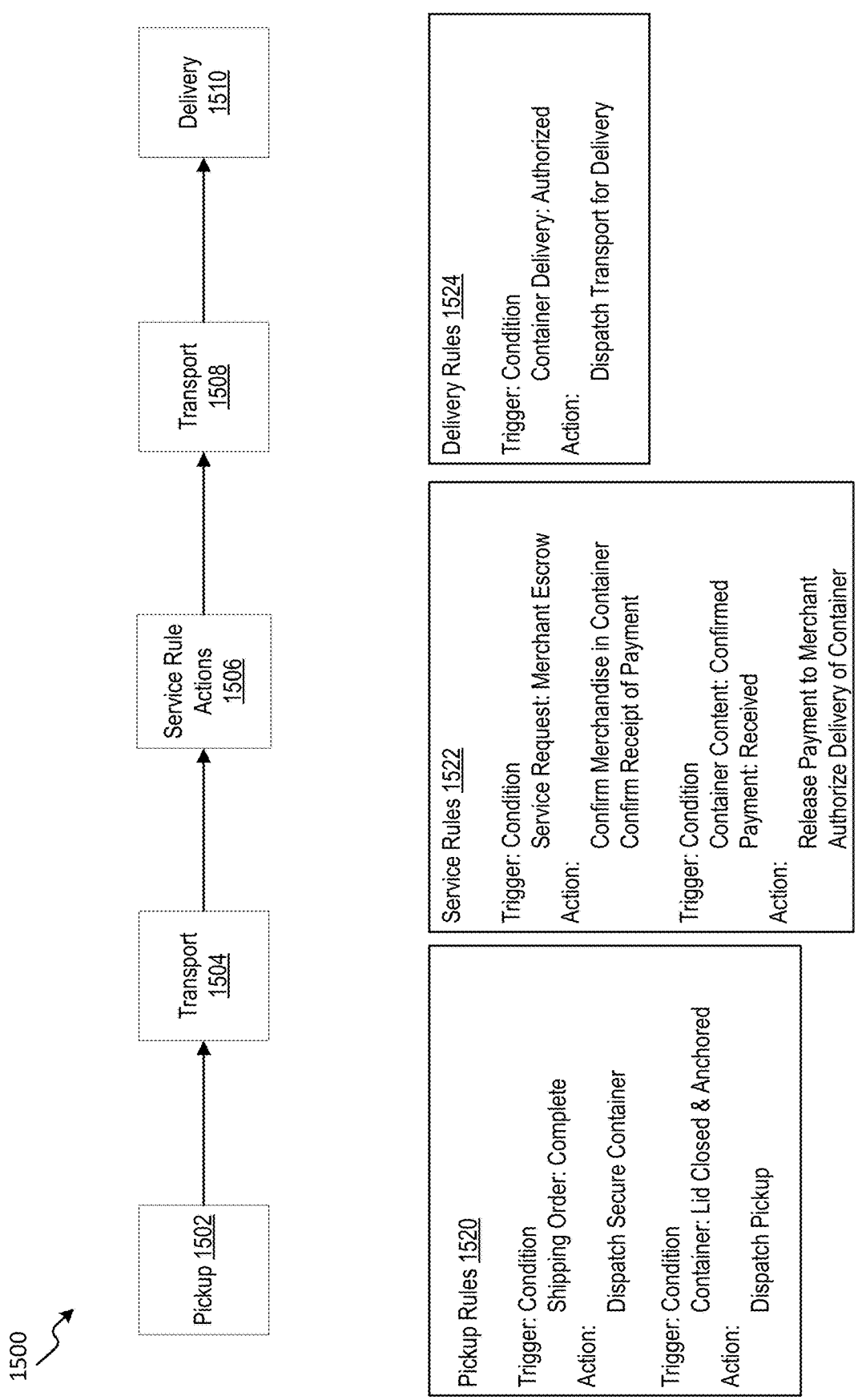
FIG. 15 illustrates operations of an example of a method for conditional delivery, according to some embodiments.

Referring to FIG. 15, an example of a method for conditional delivery is shown and generally designated 1500. A shipping order indicates one or more pickup rules 1520, one or more service rules 1522, one or more delivery rules 1524, or a combination thereof.

The transport resource allocation server 115 initiates pickup based on the pickup rules 1520 (at block 1502). For example, the transport resource allocation server 115, in response to receiving a completed shipping order, initiates transportation of the first transport container 140 to a pickup location (e.g., a reception point 860A). The transport resource allocation server 115, in response to determining that a cover 210 (e.g., a lid) of the first transport container 140 is closed and that the first transport container 140 is attached to a docking anchor point, initiates pick up by the first transport vehicle 145 of the first transport container 140. The first transport vehicle 145 transports the first transport container 140 (at block 1504).

The transport resource allocation server 115 initiates performance of one or more services based on the service rules 1522 (at block 1506). For example, the transport resource allocation server 115 determines that the shipping order indicates a service request for an escrow service. The transport resource allocation server 115 confirms whether the object (e.g., merchandise) indicated by the shipping order is in the first transport container 140. In a particular aspect, the transport resource allocation server 115, in response to determining that a tag (e.g., a RFID tag, an NFC tag, or both) detected in the first transport container 140 matches a tag identifier indicated by the shipping order, that an image captured by a sensor of the first transport container 140 matches an image indicated by the shipping order, that a user input indicates that contents of the first transport container 140 have been verified by a user to match the shipping order, or a combination thereof, determines that the object indicated by the shipping order is in the first transport container 140.

The transport resource allocation server 115 confirms whether the payment indicated by the shipping order has been received. For example, the transport resource allocation server 115 receives an indication from the transport order database 120 that the payment for the amount indicated by the shipping order has been received.

The transport resource allocation server 115, in response to determining that the object is in the first transport container 140 and that the payment has been received, releases the payment to the seller (e.g., the merchant) and authorizes delivery of the first transport container 140 to the buyer (e.g., the destination indicated by the shipping order). The transport resource allocation server 115 initiates, based on the delivery rules 1524, transportation (at block 1508) and delivery (at block 1510) of the first transport container 140.

In a particular aspect, the transport resource allocation server 115, in response to determining that the object does not match the object indicated by the shipping order, that a payment matching the amount indicated in the shipping order has not been received within a particular duration of receiving the shipping order, or both, routes the first transport container 140 for return to shipper, authorizes refund of any payment received, or both. The method 1500 thus enables the transport resource allocation server 115 to provide an escrow service that reduces risks for individual buyers and sellers. In a particular aspect, the rules engine 409 is coupled to or includes a smart contract engine based on blockchain. The smart contract engine ensures that payment and delivery actions are performed in lock step.

Figure 16:
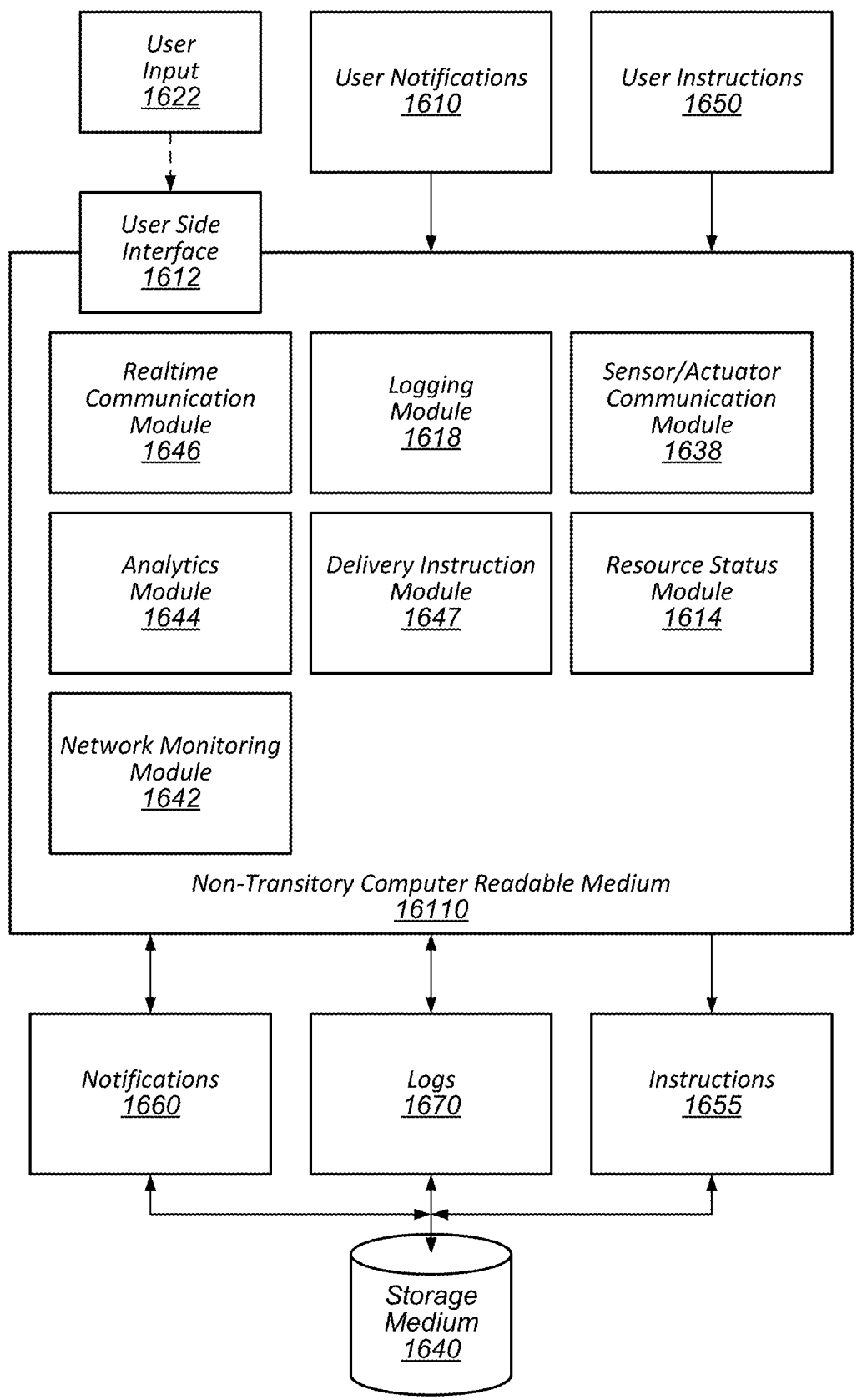
FIG. 16 illustrates modules of a non-transitory computer-readable medium which includes program code for managing a transportation network in performing conditional delivery, according to some embodiments.

FIG. 16 illustrates modules of a non-transitory computer-readable medium 16110 which includes program code for managing a transportation network in performing conditional delivery, according to various embodiments of this disclosure.

Referring to the non-limiting example of FIG. 16, non-transitory computer-readable medium 16110 is, in certain embodiments, embodied as program code installed on one or more computing platforms (for example, transport resource allocation server 115, first transport container 140, or first transport vehicle 145) within a larger environment of networked actors for implementing conditional delivery of transport containers according to various embodiments of this disclosure (for example, transportation system 100 in FIG. 1). For the purposes of illustrating its operation, non-transitory computer-readable medium 16110 is described as a series of logical modules, which operate in concert to ingest inputs (for example, user input 1622, user notifications 1610 and user instructions 1650) from a user side, as well as inputs from a system side (for example, notifications 1660, logs 1670 and instructions 1655), and provide updated system side instructions (for example, instructions 1655) controlling and triggering operations of elements of a delivery network (for example, instructions 1655).

According to certain embodiments, when executed by a processor (for example, a processor on a server), non-transitory computer readable medium 16110, provides a user-side interface 1612. In some embodiments, user-side interface 1612 comprises a graphical user interface (for example, an application or website) provided at the server, or on a client machine through which a user interacts with a transportation system via non-transitory computer-readable medium 16110. In certain embodiments, user-side interface 1612 comprises a set of application programming interfaces or middleware through which non-transitory computer-readable medium 16110 interfaces with one or more applications or processes associated with a user (for example, an address book maintained on a user's device or another application with which the user interacts, such as a shopping program or a website through which food delivery orders can be placed).

Referring to the non-limiting example of FIG. 16, user input 1622 comprises data generated in response to a user's interactions with an application linked to user-side interface, or with an actual interface presented to the user. According to certain embodiments, user input 1622 comprises one or more pieces of user-provided data associated with conditional delivery of a transport container, including, without limitation, an instruction to initiate a delivery process, or await satisfaction of a condition specified in user instructions 1650.

In some embodiments, user notifications 1610 comprise user-provided data adjusting one or more parameters associated with conditional delivery of a transport container. User notifications may be provided to non-transitory computer-readable medium 16110 as part of a user input (for example, user input 1622).

According to various embodiments of this disclosure, user instructions 1650 comprise user-specified definitions of the underlying parameters of an order for conditional delivery by components of a transportation system. Thus, while user input 1622, is, in certain embodiments, a triggering input, (e.g., an instruction by the user authorizing or triggering the performance of an operation by the transportation network), user instruction 1650 comprises a definitional set of data. According to certain embodiments, user instructions 1650 includes data specifying a delivery target, handling requirements (for example, security or refrigeration requirements), and specified conditions triggering a delivery operation (for example, the container is not to be opened until a certain credential is presented by a certain authenticated user).

According to various embodiments, non-transitory computer readable medium 16110 continuously, or semi continuously updates at least three types of system side data—notifications 1660, logs 1670, and instructions 1655, which are maintained in a storage medium 1640, and programmatically distributed to actors within a networked transportation system (for example system 100 in FIG. 1. According to certain embodiments, such updating is achieved through continuously implementing, by non-transitory computer readable medium 16110, one or more processes corresponding to the modules shown in FIG. 16.

In various embodiments according to this disclosure, non-transitory computer-readable medium 16110 includes program code, which when executed, performs processes for implementing a real-time communication module 1646. As shown in the non-limiting example of FIG. 1, real-time communication module 1646 receives user-side inputs (for example, user inputs 1622, user notifications 1610 and user instructions 1650) and normalizes and reformats the inputs for ingestion by processes performed by other modules of non-transitory computer-readable medium 16110 (for example, analytics module 1644). Additionally, real-time communication module packages the outputs of other modules within non-transitory computer readable medium 16110 in one or more system-side formats (for example, as notifications 1660, logs 1670 or instructions 1655) expected by other actors within a transportation system.

According to various embodiments, logging module 1618 handles recording changes to the system side outputs of non-transitory computer readable medium, and maintaining a confirmed record of user-side inputs. In this way, when a specified condition is associated with performance of a delivery operation having a legal dimension (for example, certified delivery of a transport container, or receipt of a signature), the logging module 1618 provides a mechanism for assured recordation of data associated with the delivery operation.

Referring to the non-limiting example of FIG. 16, sensor/actuator communication module 1638, receives and processes inputs from sensors disposed among actors (for example, transport containers and delivery vehicles) within a transportation network. According to certain embodiments, sensor/actuator communication module 1638 receives, without limitation, location data (for example, data from GPS sensors), motion data (e.g., data from accelerometers and gyroscopic sensors), environmental data (for example, data regarding the temperature or humidity within a storage hold of a transport container, and security data (for example, data regarding the status of a locking mechanism on a transport container. In some embodiments, sensor/actuator communication module 1638 aggregates, pre-processes (for example, excludes data from noisy or unreliable sensors) and passes the pre-processed data to analytics module 1644. According to various embodiments, sensor/actuator communication module 1638 further manages control inputs for actuators (for example actuators of sensors/actuators 260 in FIG. 2) and actuated components (for example, locks and HVAC units) of a transport container.

As shown in the non-limiting example of FIG. 16, analytics module 1644 receives formatted data from other modules within non-transitory computer readable medium 16110, and performs a determination as to whether a system side item of data needs to be updated in response to the received data. For example, the analytics module may receive, from logging module 1618, a confirmed date and time when a transport container whose contents include a perishable item was secured to an attachment point, the analytics module may further receive, from resource status module 1614, an indication that a particular delivery vehicle is nearby and able to perform a transit operation to a destination specified by data maintained in delivery instruction module 1647. Accordingly, analytics module 1644 may update an instruction 1655 to be stored at storage medium 1640 and transmitted via a network (for example, communication network 125 in FIG. 1) to the available delivery vehicle.

According to various embodiments, delivery instruction module 1647 manages the passage of delivery instructions into and out of non-transitory computer-readable medium 16110. For example, when delivery instructions are contained in a user instruction 1650 received via user-side interface 1612, delivery instruction module 1647 analyzes the delivery instructions and performs a mapping of the delivery instructions to resources or actors within the transportation system. For example, as part of mapping delivery instructions to system resources, delivery instruction module 1647 may identify which transport containers and transport vehicles are capable of performing delivery as specified, and pass the mapping to analytics module 1644. In this way, delivery instruction module 1647 can pre-process certain calculations associated with determining whether system-side information needs to be updated, and simplify calculations to be performed by the analytics module 1644 can be simplified, thereby conserving computation resources.

In some embodiments, network monitoring module 1642 performs at least the following functions: monitoring communications from entities within the transportation network to the server or computing platform executing non-transitory computer-readable medium 16110, and monitoring the status of network links within a network supporting the transportation network (for example, network 125 in FIG. 1).

Referring to the non-limiting example of FIG. 16, resource status module 1614 manages the collection and maintenance of data indicating the status (for example, in use, available, available, but with limitations on functionality) of resources (for example, transport containers, delivery vehicles, and components of transport containers and delivery vehicles, such as locks, climate control and communication systems.

This disclosure is not limited in its application to the examples provided, the embodiments discussed, or to the details of construction and the arrangement of components set forth in the foregoing description or drawings. The disclosure is capable of other embodiments and of being practiced or of being carried out in various ways.

What is claimed is:

1. A non-transitory computer-readable medium comprising instructions that, when executed by one or more processors, cause the one or more processors to:
receive, at a delivery management server, a delivery order for a transport container, the transport container including a secure space configured to hold an item for secure delivery, wherein the delivery order comprises instructions to defer a delivery operation until a specified condition is satisfied and the delivery order further comprises handling parameters for controlling one or more properties of the secure space;
select storage parameters based at least in part on a determination of a minimum expected delivery time for the transport container to a next delivery point;
initiate service actions for handling of the transport container until satisfaction of the specified condition, wherein the service actions include storing the transport container at a reception point in accordance with the storage parameters, wherein the reception point is an intermediate location;
receive a performance request at the delivery management server;
responsive to receiving the performance request, determine at the delivery management server whether one or more delivery conditions are satisfied; and
responsive to the specified condition being satisfied and that the one or more delivery conditions are satisfied, transmit to a delivery transport vehicle a command instructing the delivery transport vehicle to autonomously perform the delivery operation with the transport container, wherein autonomously performing the delivery operation comprises actuating, by the delivery transport vehicle, a component of the transport container to permit a service to be performed on an item.

2. The non-transitory computer-readable medium of claim 1, wherein the instructions, when executed by the one or more processors, further cause the one or more processors to:
receive external notifications from remote condition sensors; and
determine, based at least in part on the external notifications, whether the specified condition is satisfied.

3. The non-transitory computer-readable medium of claim 1, wherein a security parameter of the transport container indicates that the transport container is capable of maintaining an internal temperature below a temperature threshold for a particular duration, and wherein the storage parameters are selected based at least in part on the particular duration.

4. The non-transitory computer-readable medium of claim 3, wherein, responsive to determining that the particular duration is less than the minimum expected delivery time, the storage parameters are selected to include an ability to maintain the internal temperature below the temperature threshold for at least the minimum expected delivery time, wherein the delivery order comprises handling parameters indicating the temperature threshold.

5. The non-transitory computer-readable medium of claim 1, wherein the instructions, when executed by the one or more processors, further cause the one or more processors to, responsive to a second specified condition being satisfied, transmit to the delivery transport vehicle a command instructing the delivery transport vehicle to autonomously route the transport container for return to the reception point.

6. The non-transitory computer-readable medium of claim 1, wherein the instructions, when executed by the one or more processors, further cause the one or more processors to determine that the specified condition is satisfied based in part on determining that the delivery order indicates a drug prescription, and that a medical record specifies that a delivery of a drug is indicated by the drug prescription.

7. The non-transitory computer-readable medium of claim 1, wherein the instructions, when executed by the one or more processors, further cause the one or more processors to, responsive to determining that the specified condition is satisfied, initiate an update of an entry in a distributed ledger.

8. The non-transitory computer-readable medium of claim 1, wherein:
the delivery order further comprises a service request for an escrow service; and
the specified condition comprises an escrow payment verification.

9. A non-transitory computer-readable medium comprising instructions that, when executed by one or more processors, cause the one or more processors to:
receive, at a delivery management server, a delivery order indicating a specified condition, wherein the delivery order comprises instructions to defer performance of a delivery operation with a transport container until the specified condition is satisfied;

select, by the delivery management server, storage parameters based at least in part on a determination of a minimum expected delivery time for the transport container to a next delivery point;

initiate, by the delivery management server, service actions for handling of the transport container until satisfaction of the specified condition, wherein the service actions include storing the transport container at a reception point in accordance with the storage parameters, wherein the reception point is an intermediate location;

receive, at the delivery management server, a notification that the transport container is received at the reception point from a delivery vehicle, wherein the delivery vehicle is associated with the delivery management server;

determine that a sensor of the transport container detects a physical condition of contents of the transport container;

determine that the specified condition is satisfied based on determining that the physical condition satisfies a predetermined criterion;

receive a performance request at the delivery management server; and responsive to receiving the performance request, determine at the delivery management server whether one or more delivery conditions are satisfied, responsive to determining that the specified condition is satisfied within the transport container and that the one or more delivery conditions are satisfied, transmit, from the delivery management server to a delivery transport vehicle, a command instructing the delivery transport vehicle to autonomously perform the delivery operation with the transport container, wherein autonomously performing the delivery operation comprises actuating, by the delivery transport vehicle, a component of the transport container to permit a service to be performed on an item.

10. The non-transitory computer-readable medium of claim 9, wherein the instructions, when executed by the one or more processors, further cause the one or more processors to, responsive to the specified condition being satisfied, determine a delivery target for the transport container based on a delivery target rule indicated by the delivery order, wherein the command instructing the delivery transport vehicle to autonomously perform the delivery operation indicates the delivery target.

11. The non-transitory computer-readable medium of claim 9, wherein the instructions, when executed by the one or more processors, further cause the one or more processors to determine that a sensor of the transport container detects a physical condition of contents of the transport container, wherein, responsive to determining that the physical condition satisfies a predetermined criterion, the command instructing the delivery transport vehicle to autonomously perform the delivery operation is transmitted from the delivery management server to the delivery transport vehicle.

12. The non-transitory computer-readable medium of claim 9, wherein the instructions, when executed by the one or more processors, further cause the one or more processors to determine, at a time, that the time is within a predetermined temporal window, wherein, responsive to determining that the time is within the predetermined temporal window, the command instructing the delivery transport vehicle to autonomously perform the delivery operation is transmitted from the delivery management server to the delivery transport vehicle.

13. The non-transitory computer-readable medium of claim 9, wherein a security parameter of the transport container indicates that the transport container is capable of maintaining an internal temperature below a temperature threshold for a particular duration, and wherein the storage parameters are selected based at least in part on the particular duration.

14. The non-transitory computer-readable medium of claim 9, wherein:
the delivery order further comprises a service request for an escrow service; and
the specified condition comprises an escrow payment verification.

15. A method for providing conditional delivery using a secure delivery system, the method comprising:
receiving, at a delivery management server, a notification that a transport container is received at a reception point from a delivery vehicle, wherein the delivery vehicle is associated with the delivery management server, and wherein the reception point is an intermediate location;
receiving a delivery order at the delivery management server, wherein the delivery order comprises handling parameters for controlling one or more properties of a secure space of the transport container, and the delivery order further comprises instructions to defer a delivery operation until a specified condition is satisfied, the specified condition comprising at least one of a group including a temperature value threshold, a payment verification, a shipper location, a recipient location, or a combination thereof;
deferring, by the delivery management server, performance of the delivery operation until the specified condition is satisfied, wherein deferring the performance of the delivery operation includes keeping the transport container at the reception point until the specified condition is satisfied;
receiving a performance request at the delivery management server;
responsive to receiving the performance request, determining at the delivery management server whether one or more delivery conditions are satisfied; and
responsive to the specified condition being satisfied and that the one or more delivery conditions are satisfied, transmitting from the delivery management server to a delivery transport vehicle, a command instructing the delivery vehicle to autonomously perform the delivery operation with the transport container, wherein autonomously performing the delivery operation comprises actuating, by the delivery transport vehicle, a component of the transport container to permit a service to be performed on an item.

16. The method of claim 15, wherein the delivery order further comprises a service request for an escrow service.

17. The method of claim 16, wherein the group further includes an escrow payment verification.

18. The method of claim 15, wherein the group further includes detecting from a distributed ledger that a condition of a smart contract has been fulfilled.

19. The method of claim 15, wherein the group further includes an inference by a machine learning algorithm.

* * * * *